(12) United States Patent
Elgarisi et al.

(10) Patent No.: US 12,342,368 B2
(45) Date of Patent: Jun. 24, 2025

(54) PRIORITIZED SIGNALING VIA FUNCTIONAL APPLICATION PROGRAMMING INTERFACE (FAPI)

(71) Applicant: QUALCOMM Incorporated, San Diego, CA (US)

(72) Inventors: Yaniv Elgarisi, San Diego, CA (US); Andrei Dragos Radulescu, La Jolla, CA (US); Lior Uziel, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/659,073

(22) Filed: Apr. 13, 2022

(65) Prior Publication Data

US 2022/0338210 A1  Oct. 20, 2022

Related U.S. Application Data

(60) Provisional application No. 63/175,054, filed on Apr. 14, 2021.

(51) Int. Cl.
*H04W 72/56* (2023.01)
*H04L 1/1812* (2023.01)
(Continued)

(52) U.S. Cl.
CPC ......... *H04W 72/569* (2023.01); *H04L 1/1812* (2013.01); *H04W 72/0446* (2013.01);
(Continued)

(58) Field of Classification Search
CPC ........... H04W 72/569; H04W 72/1263; H04W 72/0446; H04W 72/542; H04W 72/21; H04W 80/02; H04L 1/18
See application file for complete search history.

(56) References Cited

U.S. PATENT DOCUMENTS

| 2006/0067228 A1 | 3/2006 | Ronciak et al. |
| 2016/0073426 A1* | 3/2016 | Bull ...................... H04W 72/23 370/336 |

(Continued)

OTHER PUBLICATIONS

3GPP TSG RAN WG1 Meeting 91, Reno, USA Nov. 27-Dec. 1, 2017 (Year: 2017).*

(Continued)

*Primary Examiner* — Brenda H Pham
(74) *Attorney, Agent, or Firm* — Patterson & Sheridan, L.L.P.

(57) ABSTRACT

Certain aspects of the present disclosure relate to wireless communications, and more particularly, to techniques for prioritized signaling via a functional application programming interface (FAPI). A method for conveying uplink (UL) payload may include receiving, at a physical (PHY) layer, a UL payload from one or more user equipments (UEs) and delivering different segments associated with the UL payload, to a medium access control (MAC) layer, in different messages via a functional application platform interface (FAPI). According to certain aspects, the different segments may carry UL payload with different priorities, and segments with higher priority UL payload may be delivered, to the MAC layer, prior to segments with lower priority UL payload.

30 Claims, 15 Drawing Sheets

(51) Int. Cl.
  *H04W 72/0446* (2023.01)
  *H04W 72/1263* (2023.01)
  *H04W 72/21* (2023.01)
  *H04W 72/542* (2023.01)
  *H04W 72/566* (2023.01)
  *H04W 80/02* (2009.01)

(52) U.S. Cl.
  CPC ....... *H04W 72/1263* (2013.01); *H04W 72/21* (2023.01); *H04W 72/542* (2023.01); *H04W 80/02* (2013.01)

(56) References Cited

U.S. PATENT DOCUMENTS

2019/0208575 A1* 7/2019 Barbieri ................ H04W 80/02
2021/0120527 A1* 4/2021 Rhim .................... H04L 5/0007

OTHER PUBLICATIONS

International Search Report and Written Opinion—PCT/US2022/071709—ISA/EPO—Jul. 20, 2022.
Mediatek Inc: "Remaining Details for CSI Reporting", 3GPP Draft, R1-1719564, 3GPP TSG RAN WG1 Meeting 91, Remaining Details for CSI Reporting, 3rd Generation Partnership Project (3GPP), Mobile Competence Centre, 650, Route Des Lucioles, F-06921, Sophia-Antipolis Cedex, France, vol. RAN WG1, No. Reno, USA, Nov 27, 2017-Dec. 1, 2017, Nov. 18, 2017 (Nov. 18, 2017), XP051369378, 4 Pages.
Qualcomm Incorporated: "UCI Enhancements for eURLLC", 3GPP Draft, R1-1911119, 3GPP TSG-RAN WG1 #98b, UCI Enhancements for EURLLC, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051809289, 18 Pages.

* cited by examiner

PRIORITIZED SIGNALING VIA FUNCTIONAL APPLICATION PROGRAMMING INTERFACE (FAPI)

CROSS-REFERENCE TO RELATED APPLICATION(S)

This application claims priority to U.S. Provisional Application No. 63/175,054 filed Apr. 14, 2021, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for prioritized signaling via a functional application programming interface (FAPI).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), TRP, etc. A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

One or more aspects of the subject matter described in this disclosure can be implemented in a method for conveying uplink (UL) payload. The method generally includes receiving, at a physical (PHY) layer, a UL payload from one or more user equipments (UEs) and delivering different segments associated with the UL payload, to a medium access control (MAC) layer, in different messages via a functional application platform interface (FAPI).

One or more aspects of the subject matter described in this disclosure can be implemented in a method for obtaining UL payload. The method generally includes signaling a PHY layer to provide a UL payload from one or more UEs to a MAC layer and obtaining different segments associated with the UL payload, from the PHY layer, in different messages via a FAPI.

One or more aspects of the subject matter described in this disclosure can be implemented in an apparatus for conveying UL payload. The apparatus generally includes a memory and at least one processor coupled with the memory. The at least one processor coupled with the memory is generally configured to receive, at a PHY layer, a UL payload from one or more UEs and deliver different segments associated with the UL payload, to a MAC layer, in different messages via a FAPI.

One or more aspects of the subject matter described in this disclosure can be implemented in an apparatus for obtaining UL payload. The apparatus generally includes a memory and at least one processor coupled with the memory. The at least one processor coupled with the memory is generally configured to signal a PHY layer to provide a UL payload from one or more UEs to a MAC layer and obtain different segments associated with the UL payload, from the PHY layer, in different messages via a FAPI One or more aspects of the subject matter described in this disclosure can be implemented in an apparatus for conveying UL payload. The apparatus generally includes means for receiving signaling indicating a beam update. The apparatus generally includes means for receiving, at a PHY layer, a UL payload from one or more UEs and means for delivering different segments associated with the UL payload, to a MAC layer, in different messages via a FAPI.

One or more aspects of the subject matter described in this disclosure can be implemented in an apparatus for obtaining UL payload. The apparatus generally includes means for signaling a PHY layer to provide a UL payload from one or more UEs to a MAC layer and means for obtaining different segments associated with the UL payload, from the PHY layer, in different messages via a FAPI.

One or more aspects of the subject matter described in this disclosure can be implemented in a computer readable medium having computer executable code stored thereon. The computer readable medium having computer executable code stored thereon generally includes code for receiving, at a PHY layer, a UL payload from one or more UEs and code for delivering different segments associated with the UL payload, to a MAC layer, in different messages via a FAPI.

One or more aspects of the subject matter described in this disclosure can be implemented in a computer readable medium having computer executable code stored thereon. The computer readable medium having computer executable code stored thereon generally includes code for signaling a PHY layer to provide a UL payload from one or more UEs to a MAC layer and code for obtaining different segments associated with the UL payload, from the PHY layer, in different messages via a FAPI To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
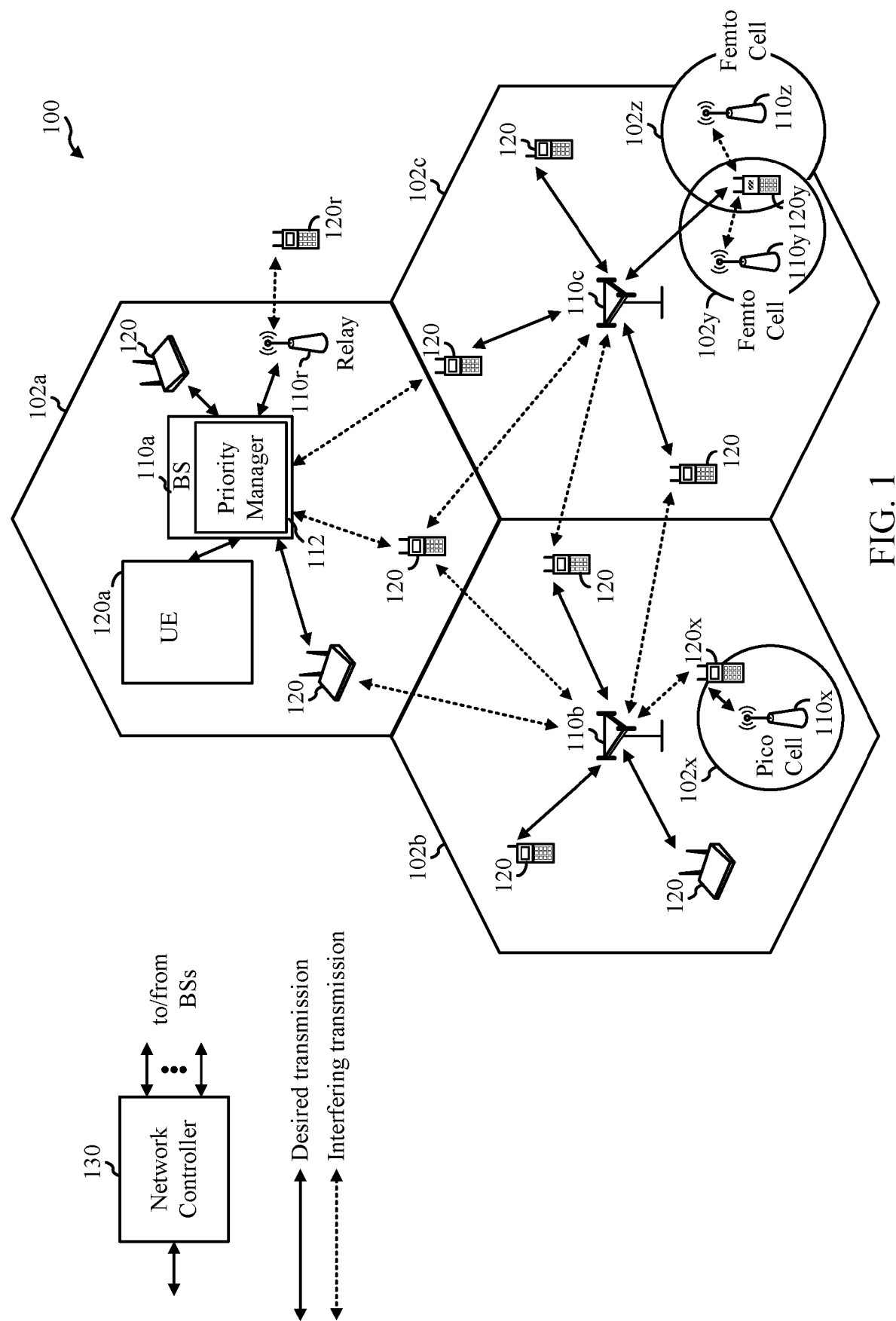
FIG. 1 is a block diagram conceptually illustrating an example wireless communication network, in accordance with certain aspects of the present disclosure.

Aspects of the present disclosure relate to wireless communications, and more particularly, to techniques for prioritized signaling via a functional application programming interface (FAPI).

The techniques presented herein may include decoupling UL payload for delivery from a physical (PHY) layer to a medium access control (MAC) layer to overcome delays in transmission (or reception) of messages. In certain aspects, decoupling of the UL payload may include decoupling high priority and low priority UL to overcome delays in transmission (or reception) of specifically important, prioritized messages. In other words, rather than waiting for all expected information to arrive at the PHY layer before passing the information up to the MAC layer, the information may be segmented and a given segment may be passed to the MAC layer as soon as its information arrives. As a result, MAC layer processing may begin sooner, which may improve overall processing and distribute traffic across the layer over time.

In certain aspects, the UL payload to be delivered to the MAC layer may be a single UL message (e.g., a single random access channel (RACH) protocol data unit (PDU) that covers multiple time and frequency resources). According to techniques presented herein, the single UL message may be segmented such that a segment includes a part of the UL message (e.g., a part of the RACH PDU for a particular time and frequency resource). In certain other aspects, the UL payload to be delivered to the MAC layer may be multiple UL messages (e.g., based on CRC, RX data, RX control, RACH, and/or SRS). According to techniques presented herein, the UL payload may be segmented such that a segment comprises a single UL message of the multiple UL messages. Further, the prioritization and segmentation of UL payloads as described herein may also apply to different traffic types, including enhanced mobile broadband (eMBB) and ultra reliable low latency communication (URLLC).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UNITS).

NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine-type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communication Network

FIG. 1 illustrates an example wireless communication network 100 (e.g., a New Radio (NR)/5G network), in which aspects of the present disclosure may be performed. For example, wireless communication network 100 may include a user equipment (UE) (e.g., such as UE 120*a*) configured to transmit uplink (UL) payload to a physical (PHY) layer of a network entity, such as a base station (BS) (e.g., BS 110*a*) performing operations 1000 of FIG. 10. The PHY layer of BS 110*a* may deliver, to a medium access control (MAC) layer of BS 110*a* performing operations 1100 of FIG. 11, different segments associated with UL payload in different messages via a functional application platform interface (FAPI). For example, BS 110*a* may include a Priority Manager 112 configured to decouple UL payload for delivery from the PHY layer to the MAC layer, in accordance with aspects of the present disclosure.

As illustrated in FIG. 1, wireless communication network 100 may include a number of BSs 110 and other network entities. A BS 110 may be a station that communicates with UEs. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs having an association with the femto cell (e.g., UEs 120 in a Closed Subscriber Group (CSG), UEs 120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, BSs 110a, 110b and 110c may be macro BSs for the macro cells 102a, 102b and 102c, respectively. BS 110x may be a pico BS for a pico cell 102x. The BSs 110y and 110z may be femto BSs for the femto cells 102y and 102z, respectively. A BS 110 may support one or multiple (e.g., three) cells.

Wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110r may communicate with a BS 110a and a UE 120r to facilitate communication between the BS 110a and the UE 120r. A relay station may also be referred to as a relay BS, a relay, etc.

Wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, BSs 110 may have similar frame timing, and transmissions from different BSs 110 may be approximately aligned in time. For asynchronous operation, BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs 110. Network controller 130 may communicate with BSs 110 via a backhaul. BSs 110 may also communicate with one another (e.g., directly or indirectly) via wireless or wireline backhaul.

UEs 120 (e.g., 120x, 120y, etc.) may be dispersed throughout wireless communication network 100, and each UE 120 may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs 120 may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplex (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a BS, Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE 120 and a serving BS 110, which is a BS 110 designated to serve the UE 120 on the downlink (DL) and/or uplink (UL). A finely dashed line with double arrows indicates interfering transmissions between a UE 120 and a BS 110. Other lines show component to component (e.g., UE 120 to UE 120) communication options.

Figure 2:
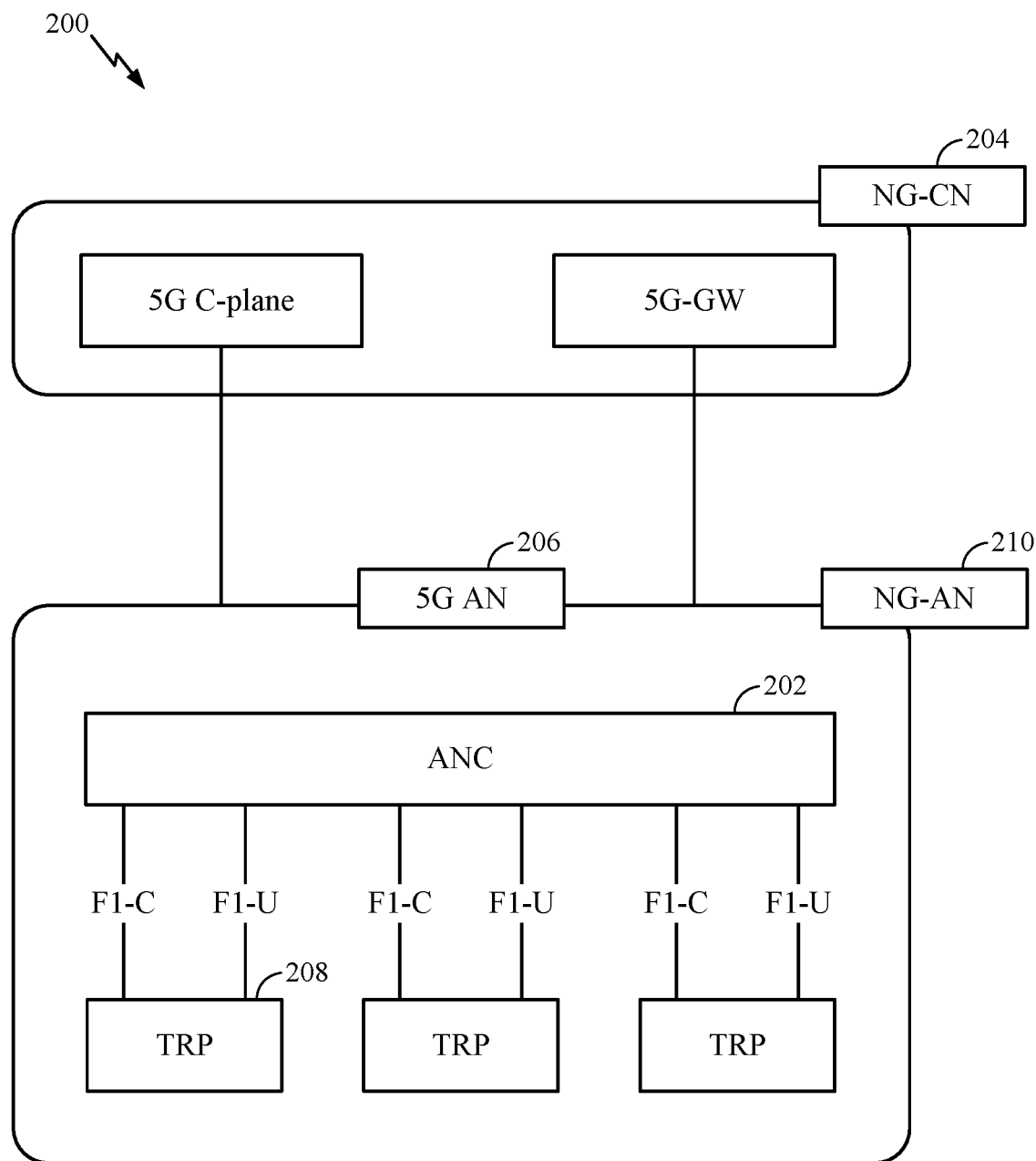
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in wireless communication network 100 illustrated in FIG. 1. A 5G access node (AN) 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3A:
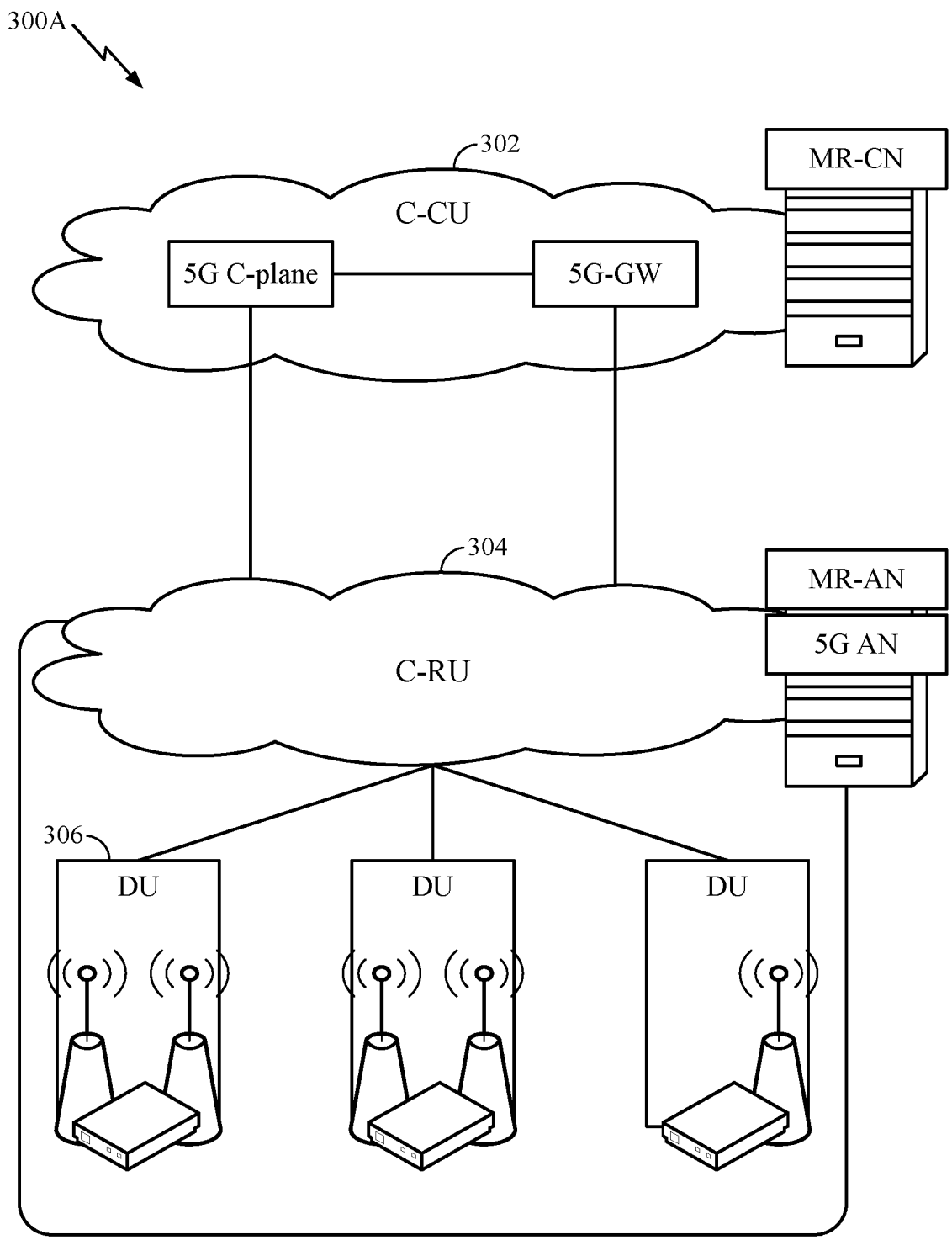
FIG. 3A is a diagram illustrating an example physical architecture of a distributed RAN, in accordance with certain aspects of the present disclosure.

FIG. 3 illustrates an example physical architecture of a distributed RAN 300A, in accordance with certain aspects of the present disclosure. A centralized core network unit (C-CU) 302 may host core network functions. C-CU 302 may be centrally deployed. C-CU 302 functionality may be offloaded (e.g., to advanced wireless services (AWS)) in an effort to handle peak capacity.

A centralized RAN unit (C-RU) 304 may host one or more ANC functions. Optionally, C-RU 304 may host core network functions locally. C-RU 304 may have distributed deployment. C-RU 304 may be close to the network edge.

A DU 306 may host one or more TRPs (Edge Node (EN), an Edge Unit (EU), a Radio Head (RH), a Smart Radio Head (SRH), or the like). DU 306 may be located at edges of the network with radio frequency (RF) functionality.

BS-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3B:
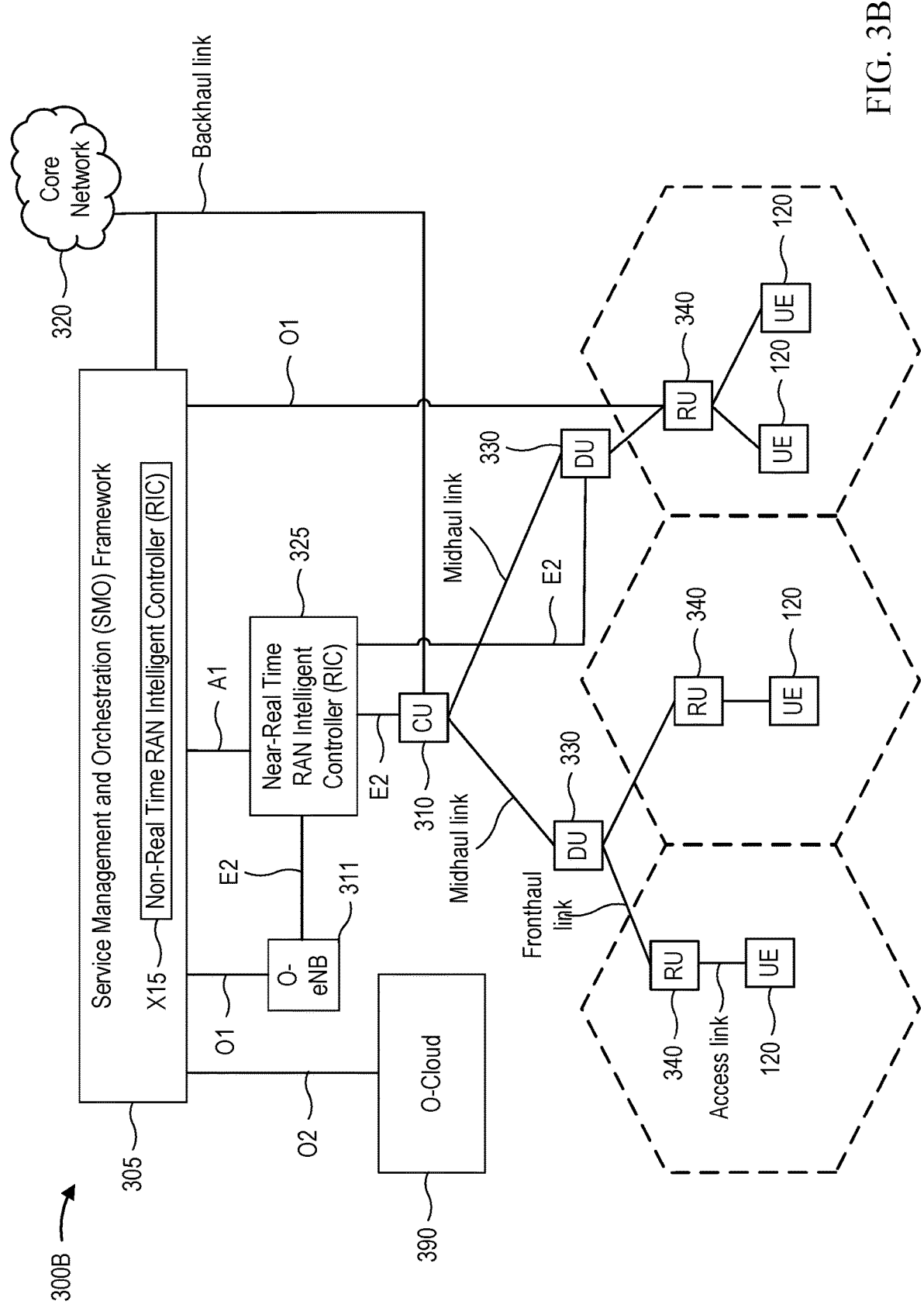
FIG. 3B is a diagram illustrating an example disaggregated base station (BS) architecture, in accordance with certain aspects of the present disclosure.

FIG. 3B is a diagram illustrating an example disaggregated BS 300B architecture. The disaggregated BS 300B architecture may include one or more central units (CUs) 310 that can communicate directly with a core network 320 via a backhaul link, or indirectly with the core network 320 through one or more disaggregated BS units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
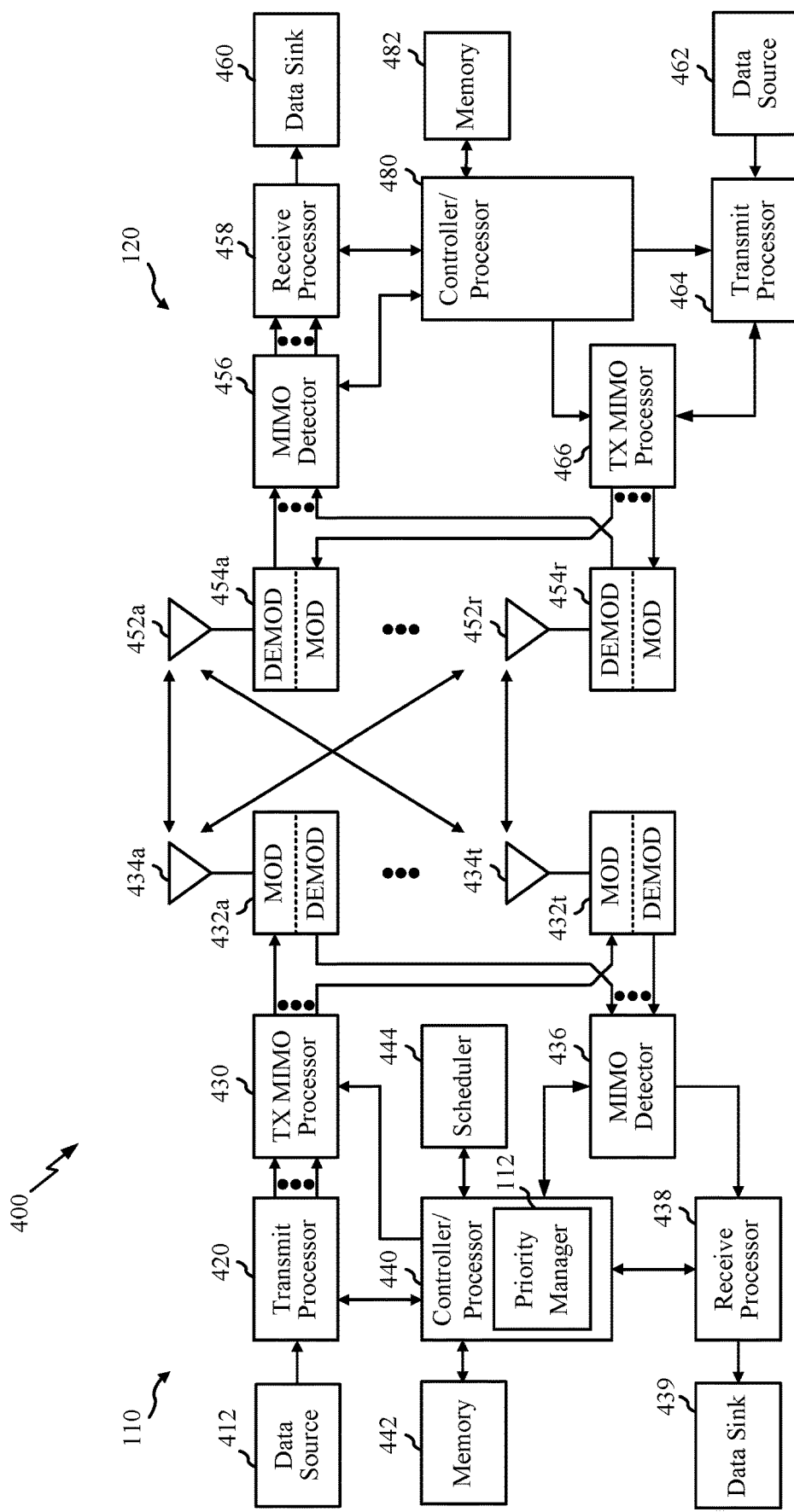
FIG. 4 is a block diagram conceptually illustrating a design of an example BS and an example user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 434, processors 420, 430, 438, and/or controller/processor 440, which includes Priority Manager 112, of BS 110 may be used to perform operations 1000 of FIG. 10 and/or 1100 of FIG. 11.

At BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. Processor 420 may process (e.g., encode and symbol map) the data and control information to obtain data symbols and control symbols, respectively. Processor 420 may also generate reference symbols, e.g., for the primary synchronization signal (PSS), secondary synchronization signal (SSS), and cell-specific reference signal (CRS). A transmit (TX) MIMO processor 430 may perform spatial processing (e.g., precoding) on the data symbols, the control symbols, and/or the reference symbols, if applicable, and may provide output symbol streams to the modulators (MODs) in transceivers 432a through 432t. Each modulator in transceiver 432 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators in transceivers 432a through 432t may be transmitted via the antennas 434a through 434t, respectively.

At UE 120, antennas 452a through 452r may receive the DL signals from BS 110 and may provide received signals to the demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the UL, at UE 120, a transmit processor 464 may receive and process data (e.g., for the physical uplink shared channel (PUSCH)) from a data source 462 and control information (e.g., for the physical uplink control channel (PUCCH)) from controller/processor 480. Transmit processor 464 may also generate reference symbols for a reference signal (e.g., for the sounding reference signal (SRS)). The symbols from transmit processor 464 may be precoded by TX MIMO processor 466 if applicable, further processed by the demodulators in transceivers 454a through 454r (e.g., for SC-FDM, etc.), and transmitted to BS 110. At BS 110, the UL signals from UE 120 may be received by antennas 434, processed by modulators in transceivers 432, detected by MIMO detector 436 if applicable, and further processed by receive processor 438 to obtain decoded data and control information sent by UE 120. Receive processor 438 may provide the decoded data to a data sink 439 and the decoded control information to controller/processor 440.

Controllers/processors 440 and 480 may direct the operation at BS 110 and UE 120, respectively. Processor 440 and/or other processors and modules at BS 110 may perform or direct the execution of processes for the techniques described herein (e.g., to perform operations 1000 and 1100 of FIGS. 10 and 11), while processor 480 and/or other processors and modules at UE 120 may perform or direct the execution of processes for the techniques described herein. Memories 442 and 482 may store data and program codes for BS 110 and UE 120, respectively. A scheduler 444 may schedule UEs 120 for data transmission on the DL and/or UL.

Figure 5:
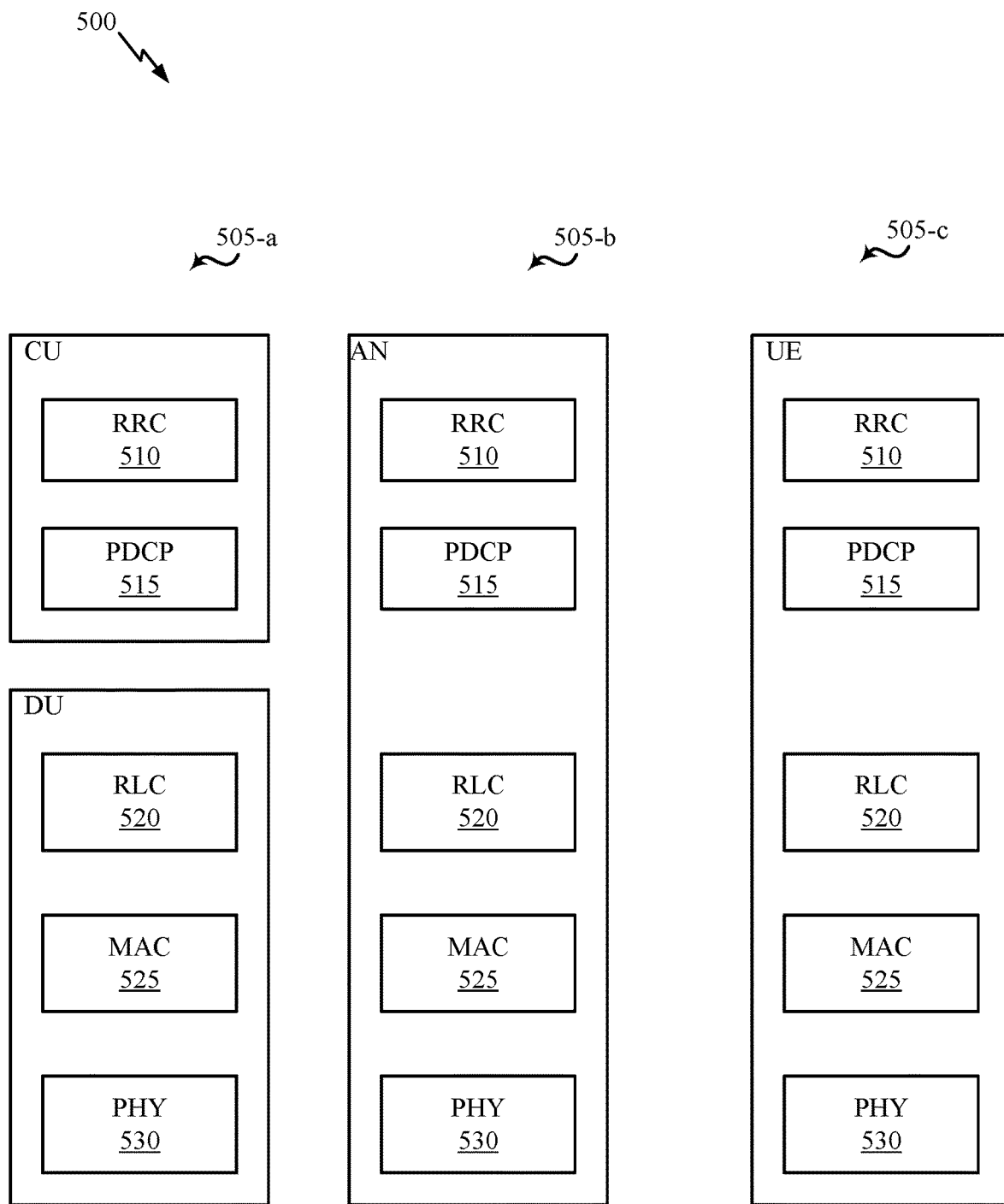
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stack may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 millisecond (ms) subframe. In NR, a subframe is still 1 ms, but the basic TTI is referred to as a slot. A subframe contains a variable number of slots (e.g., 1, 2, 4, 8, 16, . . . slots) depending on the subcarrier spacing (SCS). The NR resource block (RB) is 12 consecutive frequency subcarriers. NR may support a base SCS of 15 KHz and other SCS may be defined with respect to the base SCS, for example, 30 kHz, 60 kHz, 120 kHz, 240 kHz, etc. The symbol and slot lengths scale with the SCS. The CP length also depends on the SCS.

Figure 6:
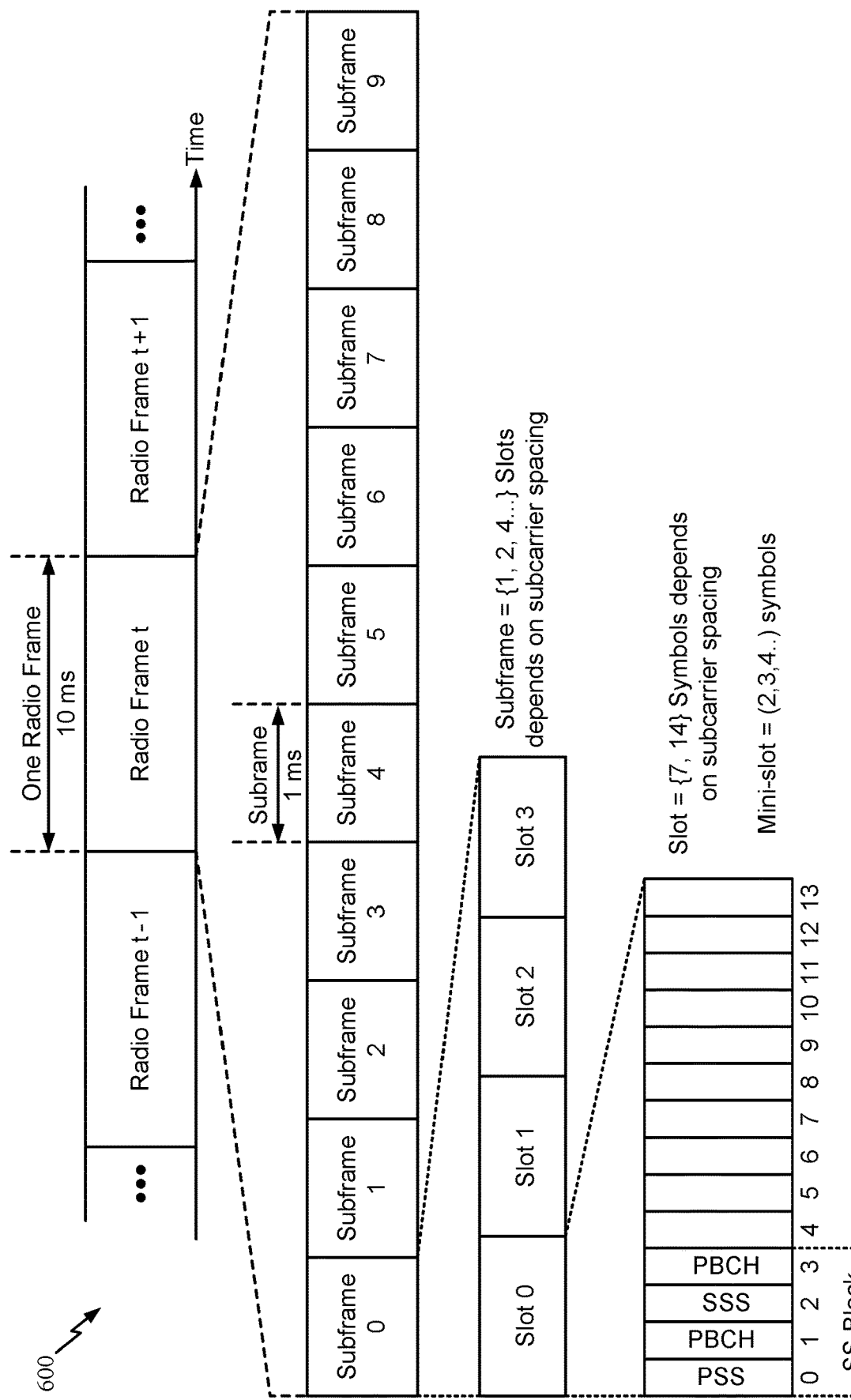
FIG. 6 illustrates an example of a frame format for a new radio (NR) system, in accordance with certain aspects of the present disclosure.

FIG. 6 is a diagram showing an example of a frame format 600 for NR, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a TTI having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 6. The PSS and SSS may be used by UEs for cell search and acquisition. The PSS may provide half-frame timing, and the SSS may provide the CP length and frame timing. The PSS and SSS may provide the cell identity. The PBCH carries some basic system information, such as downlink system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB may be transmitted up to sixty-four times, for example, with up to sixty-four different beam directions for millimeter wave (mmW). The multiple transmissions of the SSB are referred to as the SS burst set. SSBs in an SS burst set may be transmitted in the same frequency region, while SSBs in different SS bursts sets can be transmitted at different frequency regions.

Example Small Cell Product Architecture and Interfaces

Different functional radio access network (RAN) split options may indicate which layers of the protocol stack are mapped to a radio unit (RU), distributed unit (DU), or centralized unit (CU) depending on latency and backhaul bandwidth requirements. Thus, split-RAN architectures provide greater flexibility in meeting different deployment scenarios. The Small Cell Forum (SCF), an organization active in defining and promoting open standards to encourage interoperability at every layer of the RAN, supports such 5G functional split architectures.

Figure 7:
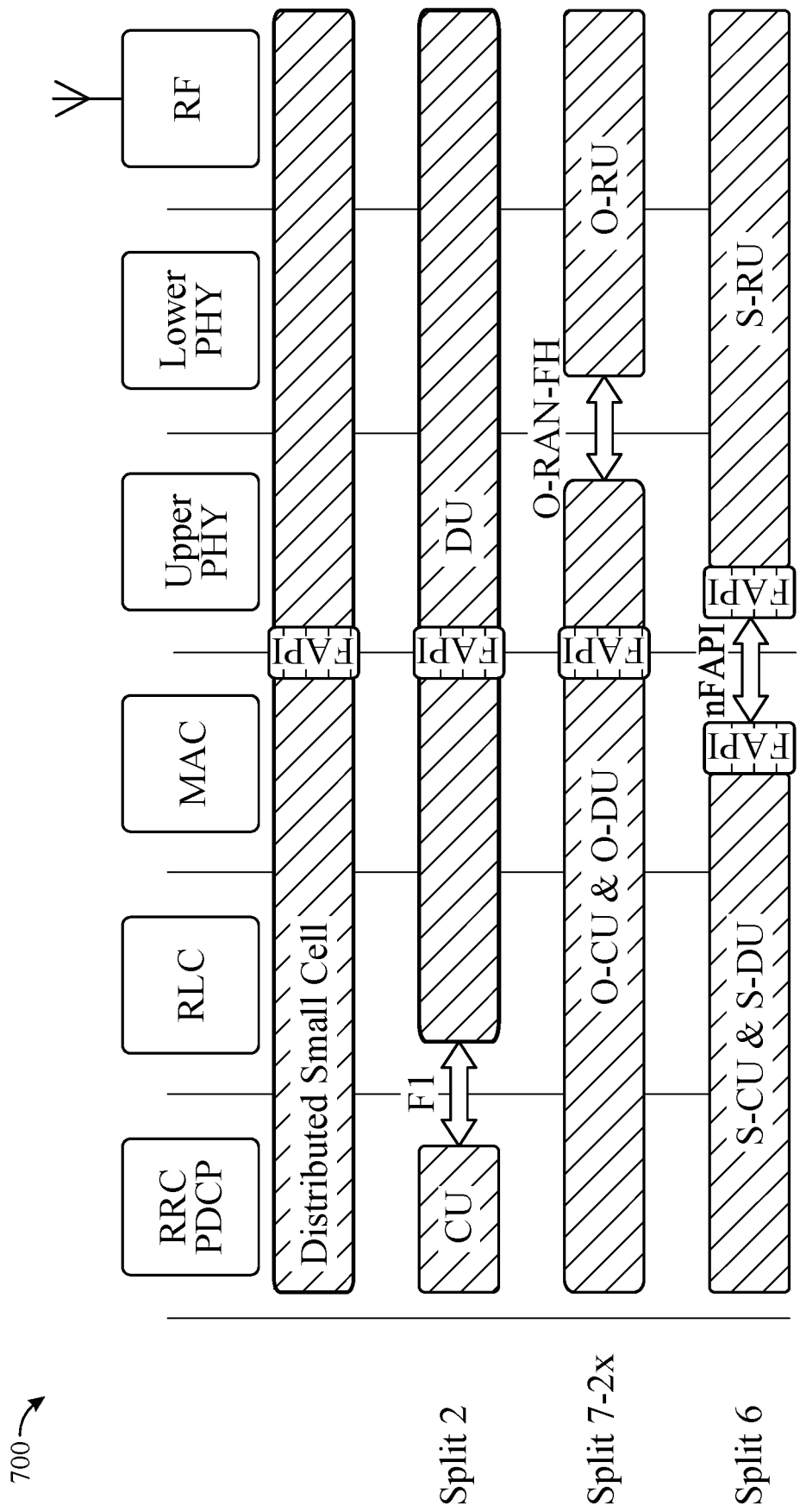
FIG. 7 illustrates example 5G RAN functional splits, in accordance with certain aspects of the present disclosure.

FIG. 7 illustrates example 5G RAN functional splits 700. As shown in FIG. 7, architectures supported may include the traditional monolithic architecture, the 3GPP defined 5G-NR split option 2 architecture, the Open RAN (O-RAN) Alliance defined split option 7-2× architecture, and SCF defined split option 6 architecture. Functional splitting in split 2 splits the radio resource control (RRC) and packet data convergence protocol (PDCP) from the Layer 2 (L2) radio link control (RLC). Functional splitting in split 7-2× splits the DU/CU (Open DU (O-DU)/Open CU (O-CU)) and radio unit (open RU (O-RU)) to divide the function of the physical (PHY) layer such that the high PHY resides in DU and the low PHY resides in RU. Functional splitting in split 6 splits the medium access control (MAC) and PHY layers. Specifically, the MAC, RLC, and upper layers are part of the CU. There is no lower PHY/higher PHY split, instead, the full stack of the PHY layer and the radio frequency (RF) are in the DU/RU.

SCF further defines a functional application platform interface (FAPI) used to enable multi-vendor interoperability between vendors that provide silicon chipsets and protocol software that go into small cell products. FAPI enables interoperability between vendors of different products of the 3$^{rd}$ Generation Partnership Program (3GPP) split option 6 based RAN architecture (described with respect to FIG. 7), namely the RU (named by SCF as S-RU) and DU (named by SCF as S-DU).

FAPI defines four interfaces, referred to as P4, P5, P7 & P19, between the software layers that implement MAC & upper protocol layers and hardware that PHY and RF layers of a 5G small cell, for example, a next generation NodeB (gNB or gNodeB). Together, these interfaces provide a robust set of APIs to enable fully open, multivendor 5G small cell designs down to a chip level.

Figure 8:
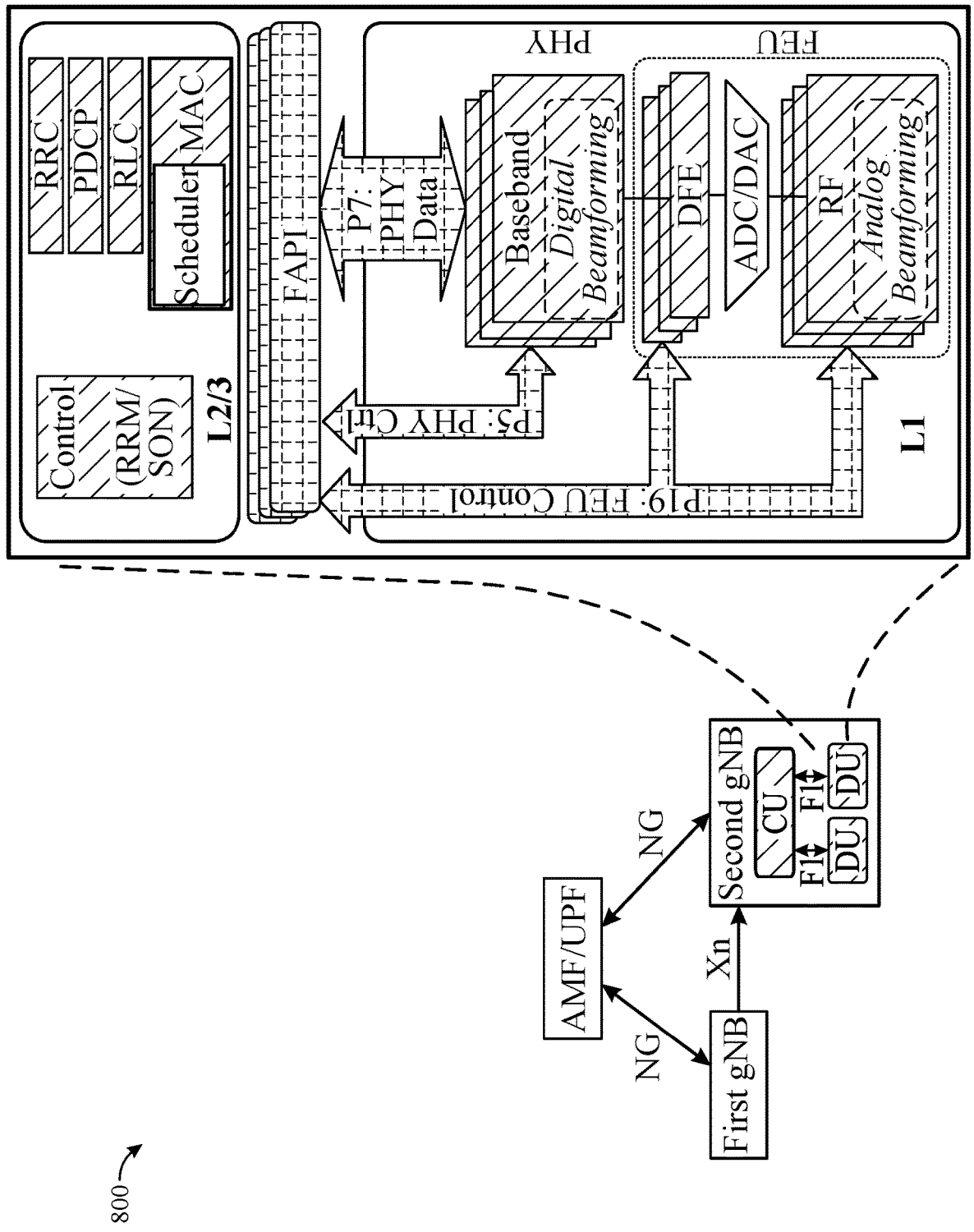
FIG. 8 illustrates example Functional Application Programming Interface (FAPI) architecture and interfaces for a B S, in accordance with certain aspects of the present disclosure

FIG. 8 illustrates example FAPI architecture and interfaces 800 for a gNB, in accordance with certain aspects of the present disclosure. As shown in FIG. 8, a first gNB (e.g., LTE eNB) may take the role of a master and a second gNB (e.g., 5G gNB) may take the role of a slave, wherein both the first and second gNBs are connected over the Xn interface.

The second gNB (e.g., 5G gNB) can be separated into a CU and one or more DUs, which are connected over the F1 interface. The CU contains the functionality of the PDCP layer as well as the RRC layer and has interfaces to the first gNB (e.g., Xn). The DU contains the functionality of the RLC layer, the MAC layer, and the PHY layer.

FAPI P19 interface is a control interface between the L2/Layer 3 (L3) software and the RF front-end-unit (FEU). The FEU models RF and the digital front end (DFE). FAPI P4 interface (not shown) is a "sensing" interface for a network monitor/listen mode (NMM) function. FAPI P5 and P7 interfaces are control and data path interfaces between the MAC and PHY layers, respectively. The FAPI P5 interface is used for transmitting static configuration from the MAC to the PHY, and the P7 interface is used for transmitting data or semi-dynamic configuration from the MAC to the PHY.

Figure 9:
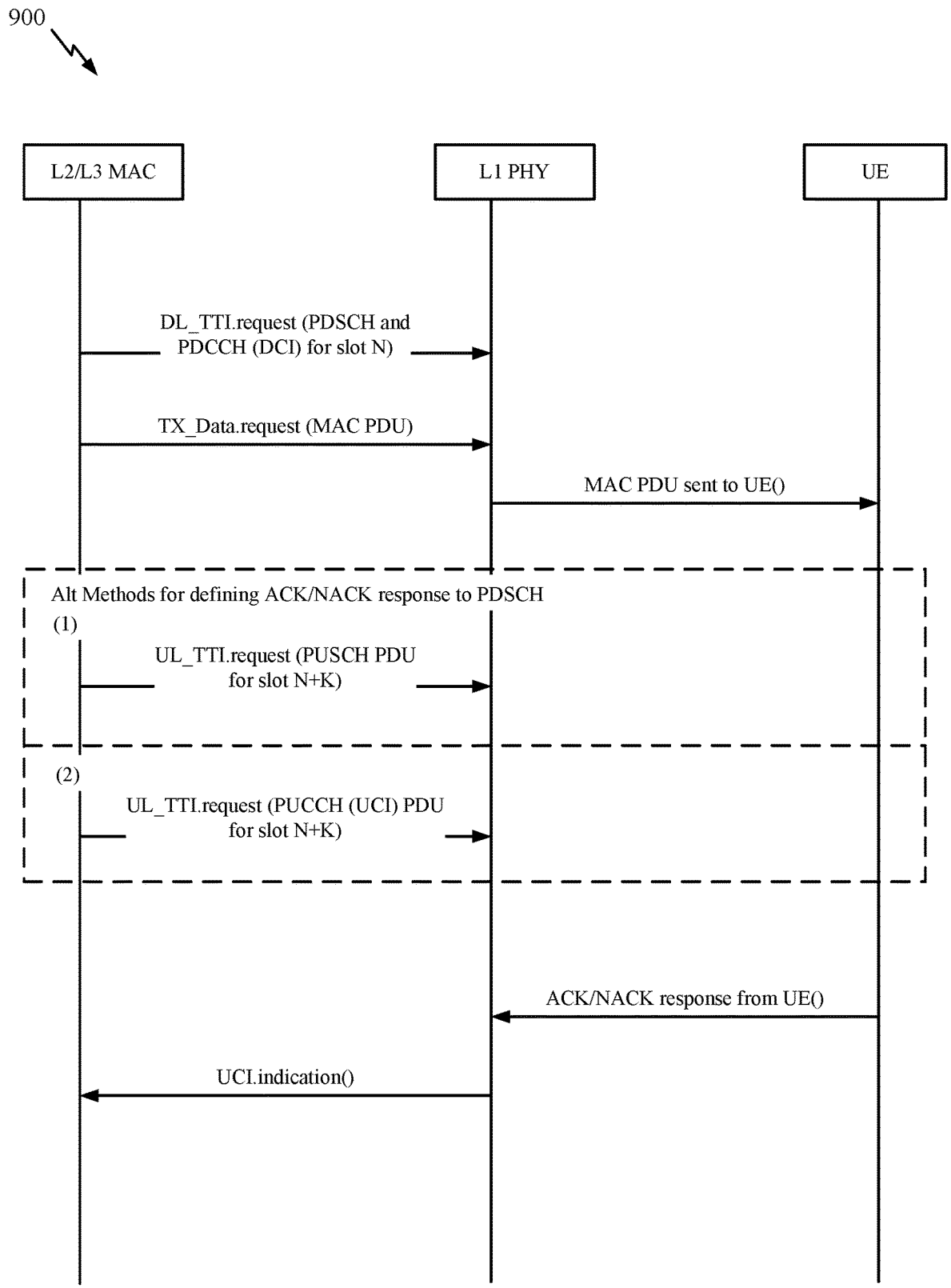
FIG. 9 is a call flow diagram illustrating example signaling across FAPI for scheduling a downlink (DL) transmission, in accordance with certain aspects of the present disclosure.

A basic FAPI P7 procedure may consist of scheduling downlink (DL) transmission. FIG. 9 is a call flow diagram 900 illustrating example signaling across the FAPI P7 interface for scheduling a DL transmission, in accordance with certain aspects of the present disclosure. As shown in FIG. 9, an L2/L3 MAC layer may notify a Layer 1 (L PHY layer that it intends to transmit control information (e.g., on a physical downlink control channel (PDCCH)) or data (e.g., on a physical downlink shared channel (PDSCH)) by first issuing a DL_TTI.request. The DL_TTI.request may contain data structures for configuring the DL channel, either the PDCCH or PDSCH. The MAC layer may then issue a second message, TX_Data.request which indicates to the PHY layer what transport block (TB) (i.e., essentially, a MAC protocol data unit (PDU) generated by the MAC layer becomes the PHY service data unit (SDU), which may also be referred to as the TB) is to be transmitted by the channel. Receipt of this combination of messages may help the PHY layer form the channel and generate internet protocol (IP) packet(s) (e.g., including the MAC PDU) for transmission to a UE. At a later time, the UE may indicate through the use of hybrid automatic repeat request (HARQ) acknowledgement (ACK)/negative ACK (NACK) feedback whether the transmission was successful or not. The HARQ ACK/NACK feedback may be transmitted in a slot N+K, where N represents the slot where the DL channel was transmitted and K is an integer greater than zero. Accordingly, the MAC layer may transmit an UL_TTI.request to the PHY layer to notify the PHY layer that the UE may be transmitting ACK/NACK feedback in response to the prior DL transmission so that the PHY layer may be prepared to receive and decode the feedback. The UL_TTI.request may either be an uplink (UL) request indicating a physical uplink shared channel transport (PUSCH) transport for HARQ response or a UL request indicating a physical uplink control channel (PUCCH) for HARQ response. Assuming the HARQ response is successfully decoded by the PHY layer, the PHY layer may notify the MAC layer by an uplink control information (UCI) indication as to whether the HARQ response contained ACK or NACK feedback.

Example Prioritized Signaling Via Functional Application Programming Interface (FAPI)

Aspects of the present disclosure relate to wireless communications, and more particularly, to techniques for prioritized signaling via a functional application programming interface (FAPI). As noted above, the techniques presented herein may include decoupling high priority and low priority UL payload for delivery from a PHY layer to a MAC layer to overcome delays in transmission or reception of messages, specifically important, prioritized messages. The techniques may be applied to convey prioritize, for example, different types of uplink control information (UCI) and/or other types of payload.

As described herein, for 5G FAPI, a MAC layer and a PHY layer may both reside (physically co-located or distributed) in a next generation NodeB (gNB or gNodeB) resulting in FAPI existing as an internal interface within the gNB. The 5G FAPI PHY application programming interface (API) may allow for the passage of data-plane and control-plane information.

In some cases, PHY API may be used to transfer slot-specific data between layer 2 (L2)/Layer 3 (L3) software (e.g., MAC layer) and the PHY layer. However, a conventional PHY API may contain constraints as to when certain messages may be sent, or may be received, by the L2/L3 software. For example, such uplink (UL) API message constraints may limit the number of uplink control information (UCI) indications (UCI.indication messages) to only one instance per numerology and slot. Similar limitations may be applied for cyclic redundancy check (CRC) indications (CRC.indication messages), receive (RX) data indications (RX_data.indication messages), random access channel (RACH) indications (RACH.indication messages), and sounding reference signal (SRS) indications (SRS.indication messages).

With respect to UCI, UCI messages may be transmitted by one or more user equipments (UEs) to the PHY layer to support the scheduling of UL channel transmissions. UCI messages may be encoded and transmitted through a physical uplink control channel (PUCCH) or a physical uplink shared channel (PUSCH). In some cases, the UCI payload may be multiplexed onto a PUSCH. Information carried by the UCI may include, a scheduling request (SR), hybrid automatic repeat request (HARQ) acknowledgement (ACK)/negative ACK (NACK) feedback, rich channel state information (CSI) (e.g., CSI Part II) and/or basic CSI (e.g., CSI Part I). A UE may transmit any combination of SR, HARQ ACK/NACK, basic CSI, or rich CSI in UCI. UCI may be encoded per UE, and information within the UCI may be encoded separately. For example, rich CSI may be encoded separately from basic CSI, SR, and HARQ.

Unfortunately, UCI decoding and transmission at the PHY layer may compete for resources with other messages and signaling (e.g., physical uplink shared channel (PUSCH) or random access channel (RACH)), including, in some cases, downlink messages and resources (e.g. physical downlink shared channel (PDSCH) PDU processing in PHY might compete for computing resources with PUCCH decoding and P7 signaling), or, in some cases, may be subject to different requirements. For example, FAPI may have limited bandwidth which may consequently delay transmission of UCI to the MAC layer when other messages need to be transmitted by the PHY layer. As another example, PHY computational resources may be limited which may also consequently delay transmission of the UCI given that the PHY layer is required to decode all messages prior to making UCI content available to the MAC layer (i.e., to comply with the PHY API "one instance per slot" constraint).

In some cases, the PHY layer may receive UCI messages from multiple UEs. Because UCI may include any combination of SR, HARQ ACK/NACK, and CSI, a UCI message from a first UE may take longer to decode compared to a UCI message from a second UE when UCI messages from both UEs are received by the PHY layer. However, in accordance with the limitation that there may be only one instance of the UCI.indication message per numerology per slot, transmission of UCI from the first UE, which was quick to decode, may be delayed until the PHY layer is able to decode the UCI from the second UE, as well. This may result in delayed high priority information, such as SR and HARQ transmitted by the first UE. Beyond UCI, similar issues may be present for other types of UL payload, as well.

To overcome delays in transmission of messages to the MAC layer, certain aspects of the present disclosure provide techniques for segmenting different types of information, for example, by decoupling signaling over the MAC/PHY interface of the gNB. The techniques presented may leverage priority information of different fields in signaling received at the PHY layer to split the signaling into one or more segments to be transmitted separately to the MAC layer.

A segment may be any segment of information from the signaling, as opposed to only a particular protocol data unit (PDU) of the signaling. In certain aspects, the first segment(s) may be used to deliver high priority payloads, whereas subsequent segment(s) may be used to deliver lower priority payloads. In certain aspects, the first segment(s) may be used to deliver a first type of traffic (e.g., enhanced mobile broadband (eMBB) and ultra reliable low latency communication (URLLC), etc.), whereas subsequent segment(s) may be used to deliver a second type of traffic.

In certain aspects, the UL payload to be delivered to the MAC layer, from the PHY layer, may be a single UL message (e.g., a single RACH PDU that covers multiple time and frequency resources). According to techniques presented herein, the single UL message may be segmented such that a segment includes a part of the UL message (e.g., a part of the RACH PDU for a particular time and frequency resource). In certain other aspects, the UL payload to be delivered to the MAC layer may include multiple UL messages (e.g., based on CRC, RX_data, RX control, RACH, and/or SRS). According to techniques presented herein, the UL payload may be segmented such that a segment comprises a single UL message of the multiple UL messages.

Figure 10:
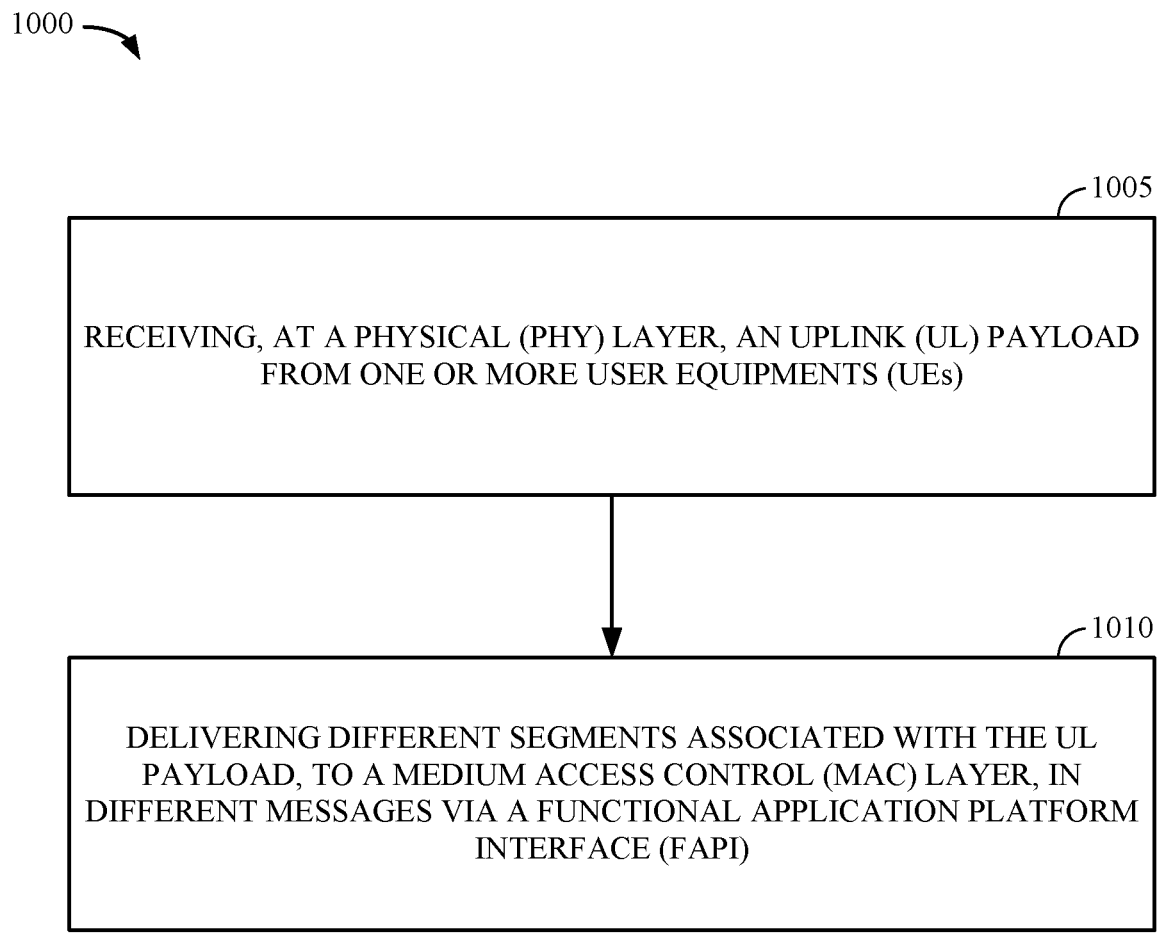
FIG. 10 illustrates example operations for wireless communications by a physical (PHY) layer of a protocol stack at a network entity, in accordance with certain aspects of the present disclosure.

FIG. 10 is a flow diagram illustrating example operations 1000 for wireless communication by a PHY layer of a BS (e.g., gNB), in accordance with certain aspects of the present disclosure. Operations 1000 may be performed, for example, by a PHY layer of BS 110a in the wireless communication network 100. In certain aspects, the PHY layer resides in a radio unit (RU) of a split radio access network (RAN).

Operations 1000 may be implemented as software components that are executed and run on one or more processors (e.g., controller/processor 240 of FIG. 2). Further, the transmission and reception of signals by the PHY layer in operations 1000 may be enabled, for example, by one or more antennas (e.g., antennas 234 of FIG. 2). In certain aspects, the transmission and/or reception of signals by the PHY layer may be implemented via a bus interface of one or more processors (e.g., controller/processor 240) obtaining and/or outputting signals.

Operations 1000 begin, at 1005, by receiving, at a PHY layer, a UL payload from one or more UEs.

At 1010, the PHY layer delivers different segments associated with the UL payload, to a MAC layer, in different messages via a FAPI.

Figure 11:
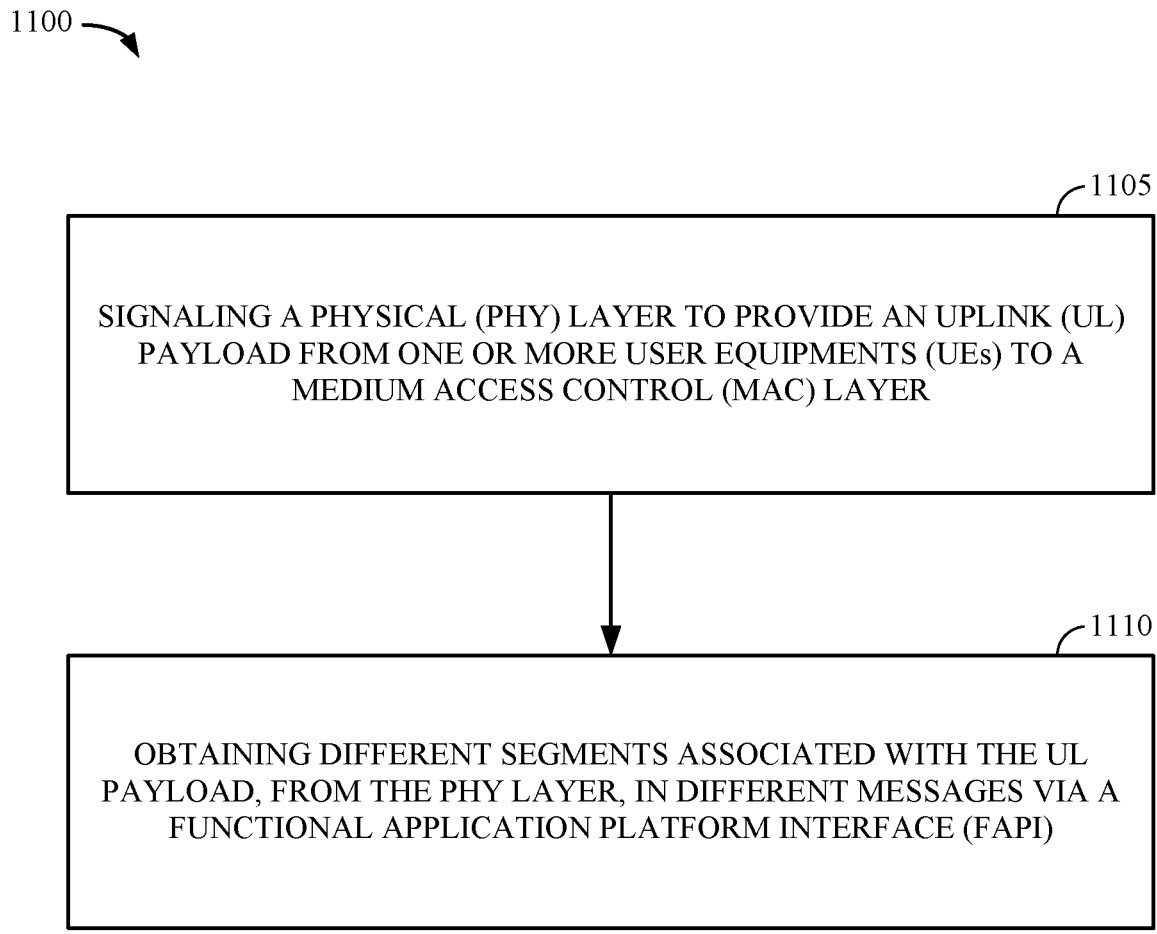
FIG. 11 illustrates example operations for wireless communications by a medium access control (MAC) layer of a protocol stack at a network entity, in accordance with certain aspects of the present disclosure.

FIG. 11 is a flow diagram illustrating example operations 1100 for wireless communication by a MAC layer of a BS (e.g., gNB), in accordance with certain aspects of the present disclosure. Operations 1100 may be performed, for example, by a MAC layer of BS 110a in wireless communication network 100. Operations 1100 may be complementary operations by the network entity to the operations 1000 performed by the PHY layer. In certain aspects, the PHY layer resides in a distributed unit (DU) of a split RAN.

Operations 1100 may be implemented as software components that are executed and run on one or more processors (e.g., controller/processor 240 of FIG. 2). Further, the transmission and reception of signals by the MAC layer in operations 1100 may be enabled, for example, by one or more antennas (e.g., antennas 234 of FIG. 2). In certain aspects, the transmission and/or reception of signals by the MAC layer may be implemented via a bus interface of one or more processors (e.g., controller/processor 240) obtaining and/or outputting signals.

Operations 1100 begin, at 1105, by signaling a PHY layer to provide a UL payload from one or more UEs to a MAC layer.

At 1110, the MAC layer obtains different segments associated with the UL payload, from the PHY layer, in different messages via a FAPI.

Figure 12:
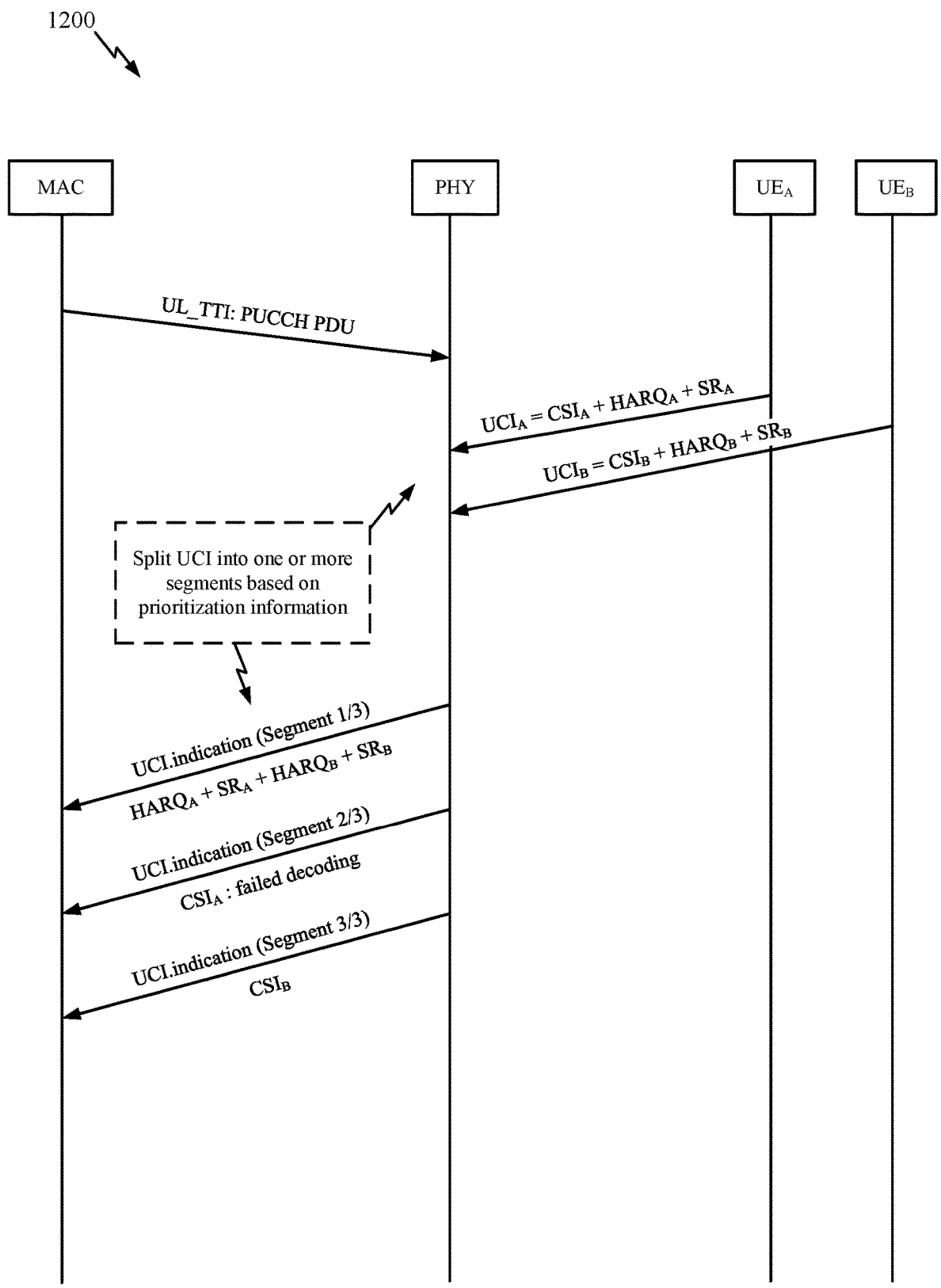
FIG. 12 is a call flow diagram illustrating example segmentation of UL payload for transmission from a PHY layer to a MAC layer, in accordance with certain aspects of the present disclosure

Operations 1000 and 1100 of FIGS. 10 and 11 may be understood with reference to diagram 1200 of FIG. 12. FIG. 12 is a call flow diagram 1200 illustrating example segmentation of UL payload for transmission from a PHY layer to a MAC layer, in accordance with certain aspects of the present disclosure.

In the example shown in FIG. 12, the conveyed UL payload is UCI as an illustrative example, but not limiting example, of one type of payload that may be segmented and conveyed according to the techniques described herein. In some examples, the UCI payload is transmitted via a PUCCH. In some examples, UCI is transmitted via a PUSCH. In some examples, UCI is transmitted via a PUSCH, wherein the UCI payload is multiplexed with other payload.

Similar to the call flow diagram of FIG. 9, a MAC layer may transmit a UL_TTI.request to a PHY layer to notify the PHY layer that one or more UEs may be transmitting UCI so that the PHY layer may be prepared to receive and decode the UCI. In this example, the UL_TTI.request may be a UL request indicating a PUCCH for UCI.

At a later time, one or more UEs (e.g., UEA and UEB) may transmit UCI (e.g., $UCI_A$ and $UCI_B$, respectively) to the PHY layer. The UCI may carry information such as, a SR, HARQ ACK/NACK feedback, CSI, or any combination thereof. As shown in FIG. 12, UEA may transmit $UCI_A$ carrying $CSI_A$, $HARQ_A$ and $SR_A$ on the PUCCH while $UE_B$ may transmit $UCI_B$ carrying $CSI_B$, $HARQ_B$, and $SR_B$ on the PUCCH. Where $UE_A$ and $UE_B$ transmit $UCI_A$ and $UCI_B$, respectively, in PUCCH using PUCCH formats 2-4 (or PUSCH), $HARQ_A$, $HARQ_B$, $SR_A$, and $SR_B$ may have higher priorities than $CSI_A$ and $CSI_B$.

According to certain aspects of the present disclosure, the PHY layer may leverage different priorities of the UL payload, for example the UCI payload, to split the UL payload into one or more segments. Specifically, the PHY layer may decouple high priority HARQ and SR from low priority CSI, as well as high priority and low priority user plane codewords. In the illustrated example, the PHY layer may split information carried in $UCI_A$ and $UCI_B$ into three different segments based, at least in part, on different priorities of the payload. Each of the different segments may carry UCI payload with different priorities. A first segment may contain $HARQ_A$, $HARQ_B$, $SR_A$, and $SR_B$, a second segment may contain $CSI_A$, and a third segment may contain $CSI_B$. The first segment may have a higher priority than the second and third segments because the first segment is carrying HARQ and SR which has a higher priority than CSI carried by the second and third segments.

At least one segment with higher priority UCI payload may be decoded by the PHY layer and delivered to the MAC layer prior to at least one segment with lower priority UCI. Accordingly, the PHY layer may decode the first segment (e.g., having a high priority) and deliver the first segment to the MAC layer via a FAPI prior to, or separately from, decoding and delivering segments 2 and 3 (e.g., each having a low priority).

As shown in the illustrated example, the PHY layer may first decode $HARQ_A$, $HARQ_B$, $SR_A$, and $SR_B$ and transmit a first UCI.indication to the MAC layer containing this decoded information (e.g., the first segment). Following the first transmission, the PHY layer may then attempt to decode $CSI_A$ and, assuming the PHY layer fails to decode $CSI_A$, transmit a second UCI.indication to the MAC layer indicating a failure to decode this information (e.g., the second segment). Following the third transmission, the PHY layer may then attempt to decode $CSI_B$ and, assuming the PHY layer succeeds in decoding the $CSI_B$, transmit a third UCI.indication to the MAC layer indicating this information (e.g., the third segment).

This implementation may reduce delays in transmission caused by the PHY layer attempting to decode all received information prior to transmission of a single UCI.indication. Instead, the MAC layer may receive information from the PHY layer without having to wait until all the information is decoded at the PHY layer. Accordingly, the MAC layer may be able to receive information quicker, or at least receive important, prioritized information, e.g., HARQ and SR, earlier.

According to certain aspects, the PHY layer may transmit, to the MAC layer, an indication of a capability of the PHY layer to support the prioritization of UL payloads, such as UCI payloads. The indication may be included in a PARAM.response message containing TLVs (tag-length-values) providing information about the PHY. In some examples, the PARAM.response message may indicate that the PHY layer supports prioritization or does not support prioritization of UL payloads.

According to certain aspects, the PHY layer may not know which types of UL payload have higher priority (e.g., unlike for HARQ and CSI). In such cases, the PHY layer may receive, from the MAC layer, an indication of prioritization information for different types of UL payload. The prioritization information may be for a single UE or across multiple UEs. For example, the prioritization information may indicate that HARQ for an enhanced mobile broadband (eMBB) UE might have a lower priority than HARQ for an enhanced ultra reliable low latency communication (eURLLC) UE, or in some cases, a lower priority than UCI for the eURLLC UE.

According to certain aspects, priorities may propagate in the network stack containing the PHY and MAC layers.

According to certain aspects, the PHY layer may transmit, to the MAC layer, an indication of a capability of the PHY layer to support segmentation of UL payloads (e.g., UCI payloads). This indication may also be included in the PARAM.response message. In some examples, the PARAM.response message may indicate a maximum number of segments the PHY layer supports. For example, the PARAM.response message may include an indication that the PHY layer supports up to $X_{cap}$ segments, wherein $X_{cap}$ is an integer equal to zero or one (e.g., indicating that segmentation is not supported) or greater (e.g., indicating that segmentation is supported).

According to certain aspects, the PHY layer may receive, from the MAC layer, an indication of a capability of the MAC layer to support segmentation of UL payloads (e.g., UCI payloads). The indication may be included in a CONFIG.request message containing TLVs describing how the PHY layer should be configured. In some examples, the CONFIG.request message may contain an indication of a maximum number of segments the PHY layer supports (e.g., up to $X_{cfg} \leq X_{cap}$, where $X_{cfg}$ and $X_{cap}$ are integers greater than or equal to zero). As an alternative to including this indication in the semi-static configuration signaling (e.g. CONFIG.request) message, the indication may instead be included in slot-oriented signaling (e.g. the UL_TTI.request), (described in detail with respect to FIG. 12).

According to certain aspects, the UL_TTI.request, may contain an indication of whether PHY is allowed to prioritize or segment UL payloads.

UCI.indication message(s) (described in detail with respect to FIG. 12) transmitted from the PHY layer to the MAC layer may include SR parameters, HARQ parameters, and CSI parameters if these parameters were included in PUCCH/PUSCH PDUs. In some cases, a bitmap may be maintained to track the presence of one or more of these PDUs. According to certain aspects of the present disclosure, the bitmap may be updated based on a mapping of the one or more PDUs to one or more segments when the PHY layer splits the UCI payload into such segments. The bitmap may further be continuously updated to indicate whether each of the one or more segments have been transmitted to the MAC layer as the PHY layer transmits each UCI.indication message to the MAC layer (e.g., transmits each decoded segment). For example, the bitmap may be updated to indicate whether SR, HARQ, or CSI was transmitted or not, if the SR, HARQ, or CSI was transmitted, what segment the SR, HARQ, or CSI was transmitted in, and/or if the PHY layer failed to decode this information. Further, PDUs skipped in a segment may be understood to be PDUs not signaled in that segment.

In some cases, prioritization and segmentation of UL payloads may reduce the likelihood of lost signaling. For example, when aiming for very low block error rate (BLER), the MAC layer may repoll the PHY layer for a lost segment (e.g., UCI.indication message or any other message). The PHY layer may receive a request, from the MAC layer, to retransmit one or more segments previously transmitted and re-transmit the one or more segments in accordance with the request. For example, where a first segment contains basic CSI (e.g., CSI Part I) and a second segment contains rich CSI (e.g., CSI Part II that has additional/more detailed information than CSI Part I), the UE may request retransmission of both CSI parts, and the UE may re-transmit the rich CSI and basic CSI together in a single segment. Repolling the PHY layer for one or more lost segments may be faster than over the air (OTA) repolling of UEs for missed information.

As described herein, UL API message constraints may not only limit the number of UCI indications (UCI.indication messages) to only one instance per slot but also CRC indications (CRC.indication messages), RX data indications (RX_data.indication messages), RACH indications (RACH.indication messages), and SRS indications (SRS.indication messages). Accordingly, prioritization and segmentation of UL payloads as described herein may also apply to UL payloads comprising at least one of CRC, RX data, RACH, or SRS. For example, RX data may benefit from prioritization/segmentation at the PHY layer by decoupling URLLC codewords (CWs) from eMBB CWs and decoding/transmitting URLLC CWs prior to decoding/transmitting eMBB CWs. As another example, SRS may benefit from prioritization/segmentation at the PHY layer by decoupling URLLC SRS from eMBB SRS and decoding/transmitting URLLC SRS prior to decoding/transmitting eMBB SRS. As another example, RACH may benefit from prioritization/ segmentation given RACH reports may become rather large (e.g., a RACH PDU may cover multiple frequency and time resources). With the user of prioritization/segmentation, the RACH report may be broken down into multiple segments such that each segment include a part of the RACH report for a particular time and frequency resource (or resources).

Example Wireless Communications Devices

Figure 13:
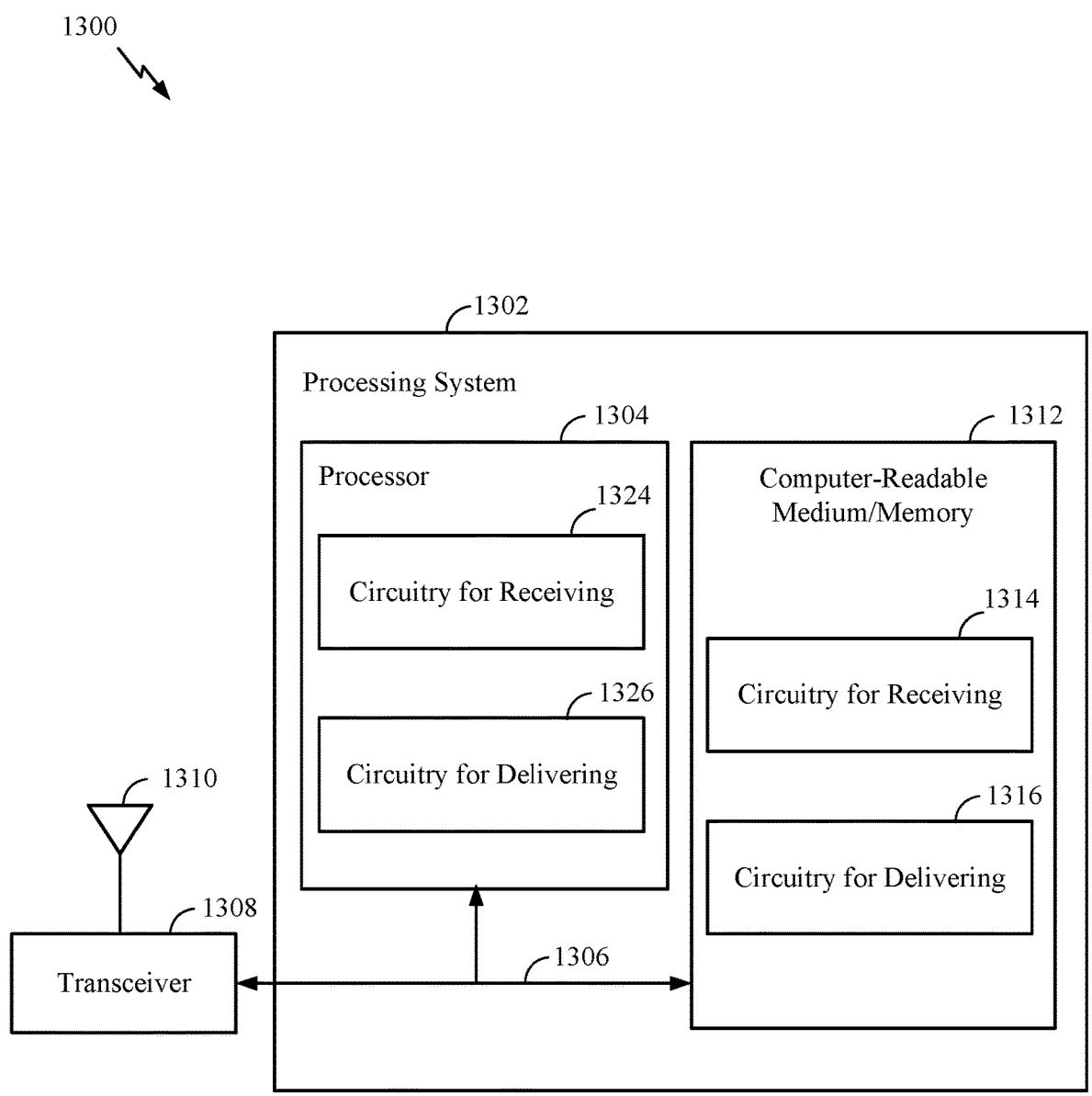
FIG. 13 illustrates a communications device that may include various components configured to perform operations for the techniques disclosed herein, in accordance with aspects of the present disclosure.

FIG. 13 illustrates a communications device 1300 that may include various components (e.g., corresponding to means-plus-function components) configured to perform operations for the techniques disclosed herein, such as operations 1000 illustrated in FIG. 10. Communications device 1300 includes a processing system 1302 coupled to a transceiver 1308 (e.g., a transmitter and/or a receiver). Transceiver 1308 is configured to transmit and receive signals for communications device 1300 via an antenna 1310, such as the various signals as described herein. Processing system 1302 may be configured to perform processing functions for communications device 1300, including processing signals received and/or to be transmitted by communications device 1300.

Processing system 1302 includes a processor 1304 coupled to a computer-readable medium/memory 1312 via a bus 1306. In certain aspects, computer-readable medium/ memory 1312 is configured to store instructions (e.g., computer-executable code) that when executed by processor 1304, cause processor 1304 to perform the operations illustrated in FIG. 10, or other operations for performing the various techniques discussed herein for decoupling high and low priority signaling for transmission/reception.

In certain aspects, computer-readable medium/memory 1312 stores code 1314 for receiving (e.g., for receiving, at a PHY layer, UL payload from one or more UEs) and code 1316 for delivering (e.g., for delivering different segments associated with the UL payload, to a MAC layer, in different messages via a FAPI).

Examples of a computer-readable medium/memory 1312 include random access memory (RAM), read-only memory (ROM), solid state memory, a hard drive, a hard disk drive, etc. In some examples, computer-readable medium/memory 1312 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In certain aspects, processor 1304 has circuitry configured to implement the code stored in computer-readable medium/ memory 1312. Processor 1304 includes circuitry 1324 for receiving (e.g., for receiving, at a PHY layer, UL payload from one or more UEs) and circuitry 1326 for delivering (e.g., for delivering different segments associated with the UL payload, to a MAC layer, in different messages via a FAPI).

Various components of communications device 1300 may provide means for performing the methods described herein, including with respect to FIG. 10.

In some examples, means for delivering, transmitting, or sending (or means for outputting for transmission) may include transceivers 432 and/or antenna(s) 434 of UE 120 illustrated in FIG. 4 and/or transceiver 1308 and antenna 1310 of communications device 1300 illustrated in FIG. 13.

In some examples, means for communicating or receiving (or means for obtaining) may include the transceivers 432 and/or antenna(s) 434 of UE 120 illustrated in FIG. 4 and/or transceiver 1308 and antenna 1310 of communications device 1300 illustrated in FIG. 13.

Notably, FIG. 13 is just one use example, and many other examples and configurations of communications device 1300 are possible.

Figure 14:
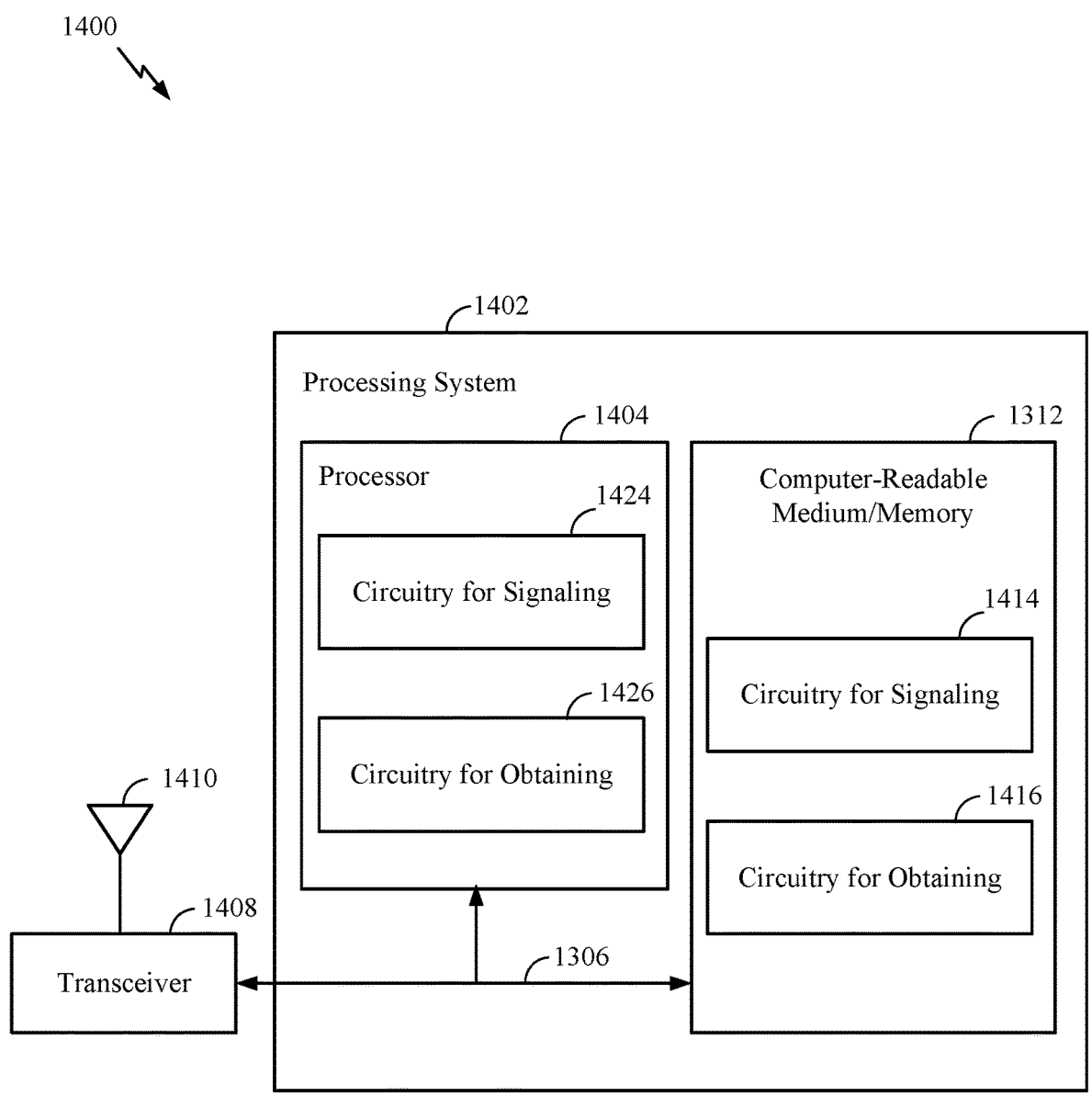
FIG. 14 illustrates a communications device that may include various components configured to perform operations for the techniques disclosed herein, in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. Communications device 1400 includes a processing system 1402 coupled to a transceiver 1408 (e.g., a transmitter and/or a receiver). Transceiver 1408 is configured to transmit and receive signals for communications device 1400 via an antenna 1410, such as the various signals as described herein. Processing system 1402 may be configured to perform processing functions for communications device 1400, including processing signals received and/or to be transmitted by communications device 1400.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by processor 1404, cause processor 1404 to perform the operations illustrated in FIG. 11, or other operations for performing the various techniques discussed herein for decoupling high and low priority signaling for transmission/reception.

In certain aspects, computer-readable medium/memory 1412 stores code 1414 for signaling (e.g., for signaling a PHY layer to provide UL payload from one or more UEs to a MAC layer) and code 1416 for obtaining (e.g., for obtaining different segments associated with the UL payload, from the PHY layer, in different messages via a FAPI).

Examples of a computer-readable medium/memory 1412 include RAM, ROM, solid state memory, a hard drive, a hard disk drive, etc. In some examples, computer-readable medium/memory 1412 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In certain aspects, processor 1404 has circuitry configured to implement the code stored in computer-readable medium/memory 1412. Processor 1404 includes circuitry 1424 for signaling (e.g., for signaling a PHY layer to provide UL payload from one or more UEs to a MAC layer) and circuitry 1426 for obtaining (e.g., for obtaining different segments associated with the UL payload, from the PHY layer, in different messages via a FAPI).

Various components of communications device 1400 may provide means for performing the methods described herein, including with respect to FIG. 11.

In some examples, means for signaling, delivering, transmitting, or sending (or means for outputting for transmission) may include transceivers 432 and/or antenna(s) 434 of BS 110 illustrated in FIG. 2 and/or transceiver 1408 and antenna 1410 of communications device 1300 illustrated in FIG. 14.

In some examples, means for communicating or receiving (or means for obtaining) may include the transceivers 432 and/or antenna(s) 434 of BS 110 illustrated in FIG. 2 and/or transceiver 1408 and antenna 1410 of communications device 1300 illustrated in FIG. 14.

Notably, FIG. 14 is just one use example, and many other examples and configurations of communications device 1400 are possible.

Example Clauses

Clause 1. A method for conveying uplink (UL) payload, comprising: receiving, at a physical (PHY) layer, a UL payload from one or more user equipments (UEs); and delivering different segments associated with the UL payload, to a medium access control (MAC) layer, in different messages via a functional application platform interface (FAPI).

Clause 2. The method of Clause 1, wherein the UL payload comprises uplink control information (UCI) payload.

Clause 3. The method of Clause 1 or 2, wherein a first segment associated with the UL payload is delivered before a second segment associated with the UL payload is fully decoded.

Clause 4. The method of Clause 2 or 3, wherein the UCI payload is received via at least one of: a physical uplink control channel (PUCCH); or a physical uplink shared channel (PUSCH).

Clause 5. The method of Clause 4, wherein the UCI payload comprises at least one of: a hybrid automatic repeat request (HARQ) feedback; a scheduling request (SR); or channel state information (CSI).

Clause 6. The method of Clause 5, wherein the CSI comprises at least one of: a first type of CSI; or a second type of CSI with additional detail relative to the first type of CSI.

Clause 7. The method of any of Clauses 1-6, wherein: the different segments carry UL payload with different priorities; and at least one segment with UL payload having a higher priority is delivered prior to at least one segment with UL payload having a lower priority.

Clause 8. The method of Clause 7, wherein the UL payload having the higher priority comprises at least one of a hybrid automatic repeat request (HARQ) feedback or a scheduling request (SR); and the UL payload having the lower priority comprises channel state information (CSI).

Clause 9. The method of Clause 8, wherein the CSI comprises a second type of CSI that has additional detail relative to a first type of CSI.

Clause 10. The method of any of Clauses 7-9, wherein the UL payload having the higher priority comprises a first type of traffic; and the UL payload having the lower priority comprises a second type of traffic.

Clause 11. The method of any of Clauses 7-10, further comprising: transmitting, to the MAC layer, an indication of a capability of the PHY layer to support prioritization of UL payloads.

Clause 12. The method of any of Clauses 7-11, further comprising: receiving, from the MAC layer, an indication of prioritization information for different types of UL payload for a single UE or for multiple UEs.

Clause 13. The method of any of Clauses 1-12, further comprising: transmitting, to the MAC layer, an indication of a capability of the PHY layer to support segmentation of UL payloads.

Clause 14. The method of Clause 13, further comprising: transmitting, to the MAC layer, an indication of a maximum number of segments the PHY layer supports.

Clause 15. The method of any of Clauses 1-14, further comprising receiving signaling indicating the PHY layer is to support segmentation of UL payloads.

Clause 16. The method of Clause 15, wherein the signaling further configures the PHY layer with a maximum number of segments to support.

Clause 17. The method of any of Clauses 1-16, further comprising: maintaining a bitmap to track presence of one or more protocol data units (PDUs); and updating the bitmap based on a mapping of the one or more PDUs to the one or more segments.

Clause 18. The method of Clause 17, further comprising updating the bitmap to indicate whether each of the one or more segments have been transmitted to the MAC layer.

Clause 19. The method of Clause 17 or 18, further comprising: receiving, a request from the MAC layer, to retransmit one or more segments previously transmitted; and re-transmitting the one or more segments in accordance with the request.

Clause 20. The method of any of Clauses 1-19, wherein the UL payload is based on at least one of: a cyclic redundancy check (CRC); receive (RX) data; RX control; a random access channel (RACH); or a sounding reference signal (SRS).

Clause 21. The method of any of Clauses 1-20, wherein the PHY layer resides in a radio unit (RU) of a split radio access network (RAN); and the MAC layer resides in a distributed unit (DU) of the split RAN.

Clause 22. A method for obtaining uplink (UL) payload, comprising: signaling a physical (PHY) layer to provide a UL payload from one or more user equipments (UEs) to a medium access control (MAC) layer; and obtaining different segments associated with the UL payload, from the PHY layer, in different messages via a functional application platform interface (FAPI).

Clause 23. The method of Clause 22, wherein the UL payload comprises uplink control information (UCI) payload.

Clause 24. The method of Clause 22 or 23, wherein a first segment associated with the UL payload is delivered before a second segment associated with the UL payload is fully decoded.

Clause 25. The method of Clause 23 or 24, wherein the UCI payload is received by the PHY layer via at least one of: a physical uplink control channel (PUCCH); or a physical uplink shared channel (PUSCH).

Clause 26. The method of Clause 25, wherein the UCI payload comprises at least one of: a hybrid automatic repeat request (HARQ) feedback a scheduling request (SR); or channel state information (CSI).

Clause 27. The method of Clause 26, wherein the CSI comprises at least one of: a first type of CSI; or a second type of CSI with additional detail relative to the first type of CSI.

Clause 28. The method of any of Clauses 22-27, wherein: the different segments carry UL payload with different priorities; and at least one segment with UL payload having a higher priority is delivered prior to at least one segment with UL payload having a lower priority.

Clause 29. The method of Clause 28, wherein the UL payload having the higher priority comprises at least one of a HARQ feedback or an SR; and the UL payload having the lower priority comprises CSI, wherein the CSI comprises a second type of CSI that has additional detail relative to a first type of CSI Clause 30. The method of Clause 29, wherein the CSI comprises a second type of CSI that has additional detail relative to a first type of CSI.

Clause 31. The method of any of Clauses 28-30, wherein the UL payload having the higher priority comprises a first type of traffic; and the UL payload having the lower priority comprises a second type of traffic.

Clause 32. The method of any of Clauses 28-31, further comprising: receiving, from the PHY layer, an indication of a capability of the PHY layer to support prioritization of UL payloads.

Clause 33. The method of any of Clauses 28-32, further comprising: transmitting, to the PHY layer, an indication of prioritization information for different types of UL payload for a single UE or for multiple UEs.

Clause 34. The method of any of Clauses 22-33, further comprising: receiving, from the PHY layer, an indication of a capability of the PHY layer to support segmentation of UL payloads.

Clause 35. The method of Clause 34, further comprising: receiving, from the PHY layer, an indication of a maximum number of segments the PHY layer supports.

Clause 36. The method of any of Clauses 22-35, further comprising providing signaling, to the PHY layer, indicating the PHY layer is to support segmentation of UL payloads.

Clause 37. The method of Clause 36, wherein the signaling configures the PHY layer with a maximum number of segments to support.

Clause 38. The method of any of Clauses 22-37, further comprising: maintaining a bitmap to track presence of one or more protocol data units (PDUs); and updating the bitmap based on a mapping of the one or more PDUs to the one or more segments.

Clause 39. The method of Clause 38, further comprising updating the bitmap to indicate whether each of the one or more segments has been received by the MAC layer.

Clause 40. The method of Clause 38 or 39, further comprising: sending a request to the PHY layer to retransmit one or more segments not received at the MAC layer.

Clause 41. The method of any of Clauses 22-40, wherein the UL payload is based on at least one of: a cyclic redundancy check (CRC); receive (RX) data; RX control; a random access channel (RACH); or a sounding reference signal (SRS).

Clause 42. The method of any of Clauses 22-41, wherein the PHY layer resides in a radio unit (RU) of a split radio access network (RAN); and the MAC layer resides in a distributed unit (DU) of the split RAN.

Clause 43. An apparatus, comprising a memory comprising computer-executable instructions and one or more processors configured to execute the computer-executable instructions and cause the one or more processors to perform a method in accordance with any one of Clauses 1-42.

Clause 44. An apparatus, comprising means for performing a method in accordance with any one of Clauses 1-42.

Clause 45. A non-transitory computer-readable medium comprising computer-executable instructions that, when executed by one or more processors, cause the one or more processors to perform a method in accordance with any one of Clauses 1-42.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus, comprising:
a processor;
memory coupled with the processor; and
instructions stored in the memory and executable by the processor to, individually or collectively, cause the apparatus to:
receive, via a function application platform interface (FAPI), at a physical (PHY) layer of a disaggregated base station (BS), from a medium access control (MAC) layer of the disaggregated BS, one or more request FAPI messages indicating an uplink (UL) payload;
receive, at the PHY layer of the disaggregated BS, the UL payload from one or more user equipments (UEs); and
deliver different segments associated with the UL payload, to the MAC layer of the disaggregated BS, in different indication FAPI messages via the FAPI.

2. The apparatus of claim 1, wherein the UL payload comprises uplink control information (UCI) payload.

3. The apparatus of claim 1, wherein a first segment of the different segments associated with the UL payload is delivered to the MAC layer before a second segment of the different segments associated with the UL payload is fully decoded at the PHY layer of the apparatus.

4. The apparatus of claim 1, wherein the UCI payload comprises uplink control information (UCI) payload, and wherein the UCI payload is received via at least one of:
a physical uplink control channel (PUCCH); or
a physical uplink shared channel (PUSCH).

5. The apparatus of claim 4, wherein the UCI payload comprises at least one of:
a hybrid automatic repeat request (HARQ) feedback;
a scheduling request (SR); or
channel state information (CSI).

6. The apparatus of claim 1, wherein the instructions are executable by the one or more processors to, individually or collectively, cause the apparatus to deliver at least one message of the different messages having a segment of the different segments associated with the UL payload with a higher priority prior to at least one message of the different messages having segment of the different segments associated with the UL payload with a lower priority.

7. The apparatus of claim 6, wherein:
the UL payload having the higher priority comprises at least one of hybrid automatic repeat request (HARQ) feedback or a scheduling request; and
the UL payload with the lower priority comprises second type of channel state information (CSI), wherein the second type of CSI has additional detail relative to a first type of CSI.

8. The apparatus of claim 6, wherein:
the UL payload with the higher priority comprises a first type of traffic; and
the UL payload with the lower priority comprises a second type of traffic.

9. The apparatus of claim 6, wherein the instructions are executable by the one or more processors to, individually or collectively, cause the apparatus to transmit, to the MAC layer, an indication of a capability of the PHY layer to support prioritization of UL payloads.

10. The apparatus of claim 6, wherein the instructions are executable by the one or more processors to, individually or collectively, cause the apparatus to receive, from the MAC layer, an indication of prioritization information for different types of UL payload.

11. The apparatus of claim 1, wherein the instructions are executable by the one or more processors to, individually or collectively, cause the apparatus to transmit, to the MAC layer, an indication of a capability of the PHY layer to support segmentation of UL payloads.

12. The apparatus of claim 11, wherein the instructions are executable by the one or more processors to, individually or collectively, cause the apparatus to transmit, to the MAC layer, an indication of a maximum number of segments the PHY layer supports.

13. The apparatus of claim 1, wherein the instructions are executable by the one or more processors to, individually or collectively, cause the apparatus to receive signaling indicating the PHY layer is to support segmentation of UL payloads, wherein the signaling further configures the PHY layer with a maximum number of segments to support.

14. The apparatus of claim 1, wherein the UL payload comprises at least one of:
a cyclic redundancy check (CRC);
uplink data;
a random access channel (RACH); or
a sounding reference signal (SRS).

15. The apparatus of claim 1, wherein:
the PHY layer resides in a radio unit (RU) of a split radio access network (RAN);
the MAC layer resides in a distributed unit (DU) of the split RAN; and
the FAPI comprises a communication interface between the RU and DU.

16. An apparatus, comprising:
one or more processors;
memory coupled with the one or more processors; and
instructions stored in memory and executable by the one or more processors to, individually or collectively, cause the apparatus to:
signal, form a medium access control (MAC) layer of a disaggregated base station (BS), via a function application platform interface (FAPI), a physical (PHY) layer of the disaggregated BS, one or more request FAPI messages indicating an uplink (UL) payload from one or more user equipments (UEs); and
obtain, at the MAC layer of the disaggregated BS, from the PHY layer of the disaggregated BS, different segments associated with the UL payload in different indication FAPI messages via the FAPI.

17. The apparatus of claim 16, wherein the UL payload comprises uplink control information (UCI) payload.

18. The apparatus of claim 16, wherein a first segment of the different segments associated with the UL payload is delivered to the MAC layer of the apparatus before a second segment of the different segments associated with the UL payload is fully decoded at the PHY layer.

19. The apparatus of claim 17, wherein the UCI payload is received by the PHY layer via at least one of:
a physical uplink control channel (PUCCH); or
a physical uplink shared channel (PUSCH).

20. The apparatus of claim 19, wherein the UCI payload comprises at least one of:
a hybrid automatic repeat request (HARQ) feedback;
a scheduling request (SR); or
channel state information (CSI).

21. The apparatus of claim 16, wherein:
the different segments carry UL payload with different priorities; and
at least one segment of the different segments carrying UL payload having a higher priority is obtained prior to at least one segment of the different segments carrying UL payload having a lower priority.

22. The apparatus of claim 21, wherein:
the UL payload having the higher priority comprises at least one of hybrid automatic repeat request (HARQ) feedback or a scheduling request; and
the UL payload having the lower priority comprises a second type of channel state information (CSI), wherein the second type of CSI has additional detail relative to a first type of CSI.

23. The apparatus of claim 21, wherein:
the UL payload having the higher priority comprises a first type of traffic; and
the UL payload having the lower priority comprises a second type of traffic.

24. The apparatus of claim 21, wherein the instructions are executable by the one or more processors to, individually or collectively, cause the apparatus to receive at the MAC layer of the apparatus, from the PHY layer, an indication of a capability of the PHY layer to support prioritization of UL payloads.

25. The apparatus of claim 16, wherein the instructions are executable by the one or more processors to, individually or collectively, cause the apparatus to receive at the MAC layer of the apparatus, from the PHY layer, an indication of a capability of the PHY layer to support segmentation of UL payloads.

26. The apparatus of claim 25, wherein the instructions are executable by the one or more processors to, individually or collectively, cause the apparatus to receive at the MAC layer of the apparatus, from the PHY layer, an indication of a maximum number of segments the PHY layer supports.

27. The apparatus of claim 16, wherein the UL payload is based on at least one of:
a cyclic redundancy check (CRC);
receive (RX) data;
a random access channel (RACH); or
a sounding reference signal (SRS).

28. The apparatus of claim 16, wherein:
the PHY layer resides in a radio unit (RU) of a split radio access network (RAN);
the MAC layer resides in a distributed unit (DU) of the split RAN; and
the FAPI comprises a communication interface between the RU and the DU.

29. A method, comprising:
receiving, via a function application platform interface (FAPI), at a physical (PHY) layer of a disaggregated base station (BS), from a medium access control (MAC) layer of the disaggregated BS, one or more request FAPI messages indicating an uplink (UL) payload;
receiving, at the PHY layer of the disaggregated BS, the UL payload from one or more user equipments (UEs); and
delivering different segments associated with the UL payload, to the MAC layer of the disaggregated BS, in different indication FAPI messages via the FAPI.

30. A method comprising:
signaling, from a medium access control (MAC) layer of a disaggregated base station (BS), via a function application platform interface (FAPI), a physical (PHY) layer of the disaggregated BS, one or more request FAPI messages indicating an uplink (UL) payload form one or more user equipments (UEs); and
obtaining, at the MAC layer of the disaggregated BS, from the PHY layer of the disaggregated BS, different segments associated with the UL payload in different indication FAPI messages via the FAPI.

\* \* \* \* \*